US009191890B2

(12) United States Patent
Jafarian et al.

(10) Patent No.: US 9,191,890 B2
(45) Date of Patent: Nov. 17, 2015

(54) SYSTEMS AND METHODS FOR LOW POWER OPERATIONS ON WIRELESS NETWORKS

(71) Applicant: Qualcomm Incorporated, San Diego, CA (US)

(72) Inventors: Amin Jafarian, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 13/789,465

(22) Filed: Mar. 7, 2013

(65) Prior Publication Data

US 2014/0112224 A1 Apr. 24, 2014

Related U.S. Application Data

(60) Provisional application No. 61/717,851, filed on Oct. 24, 2012, provisional application No. 61/719,356, filed on Oct. 26, 2012, provisional application No. 61/719,358, filed on Oct. 26, 2012.

(51) Int. Cl.
*H04W 52/02* (2009.01)
*H04W 52/36* (2009.01)
*H04W 52/58* (2009.01)

(52) U.S. Cl.
CPC ...... *H04W 52/0209* (2013.01); *H04W 52/0206* (2013.01); *H04W 52/365* (2013.01); *H04W 52/58* (2013.01); *Y02B 60/50* (2013.01)

(58) Field of Classification Search
CPC .......................... H04W 52/0209; Y02B 60/60
See application file for complete search history.

(56) References Cited

U.S. PATENT DOCUMENTS

| 6,590,886 B1 | 7/2003 | Easton et al. |
| 7,295,827 B2 | 11/2007 | Liu et al. |
| 7,904,023 B2 | 3/2011 | Vitamaki et al. |
| 8,055,313 B2 | 11/2011 | Behzad et al. |

(Continued)

FOREIGN PATENT DOCUMENTS

EP 2160061 A2 3/2010

OTHER PUBLICATIONS

Ansari J., et al., "Radio-Triggered Wake-ups with Addressing Capabilities for Extremely Low Power Sensor Network Applications," IEEE 19th International Symposium on Personal, Indoor and Mobile Radio Communications, PIMRC 2008, pp. 1-5.

*Primary Examiner* — Alpus H Hsu
*Assistant Examiner* — Anthony Luo
(74) *Attorney, Agent, or Firm* — Eric Ho

(57) ABSTRACT

IEEE 802.11 power saving mode (PSM) defines two different power modes under which stations operate: active mode and power save (PS) mode. This disclosure introduces devices, methods, and systems to implement an additional power save with ultra low power (PS-ULP) mode that further reduces power consumption. In one aspect, a method of communicating a power management mode of a station on a wireless network is disclosed. The method includes transmitting by a station a first message on the wireless network, the first message indicating one of at least three power management modes, wherein the indication is communicated in a power management portion of a frame control field of a media access control header. The power management portion comprises more than one bit; and operating the station in a power management state in accordance with the indicated power management mode.

36 Claims, 16 Drawing Sheets

(56) References Cited

U.S. PATENT DOCUMENTS

| | | |
|---|---|---|
| 8,150,477 B2 | 4/2012 | Cho et al. |
| 8,175,109 B2 | 5/2012 | Nogueira-Nine et al. |
| 8,179,873 B2 | 5/2012 | Bonta et al. |
| 8,203,985 B2 | 6/2012 | Gong et al. |
| 8,223,680 B2 | 7/2012 | Twitchell, Jr. |
| 8,249,644 B2 | 8/2012 | Taniuchi et al. |
| 2003/0128684 A1 | 7/2003 | Hirsch et al. |
| 2004/0110508 A1* | 6/2004 | Haartsen .................. 455/445 |
| 2005/0130713 A1* | 6/2005 | Simpson et al. ............ 455/574 |
| 2006/0128349 A1 | 6/2006 | Yoon et al. |
| 2006/0229053 A1 | 10/2006 | Sivard |
| 2007/0207765 A1 | 9/2007 | Nakahara et al. |
| 2007/0242634 A1 | 10/2007 | Calcev et al. |
| 2008/0108318 A1 | 5/2008 | Min et al. |
| 2008/0130603 A1* | 6/2008 | Wentink et al. ............. 370/338 |
| 2009/0147837 A1 | 6/2009 | Lau |
| 2010/0054214 A1 | 3/2010 | Igarashi et al. |
| 2010/0097969 A1 | 4/2010 | De et al. |
| 2010/0099358 A1 | 4/2010 | Kumar et al. |
| 2011/0141969 A1 | 6/2011 | Sridhara et al. |
| 2011/0194471 A1 | 8/2011 | Kim et al. |
| 2011/0298435 A1* | 12/2011 | Homol et al. ............... 323/282 |
| 2012/0120859 A1 | 5/2012 | Stephens et al. |
| 2012/0171954 A1 | 7/2012 | Rudland et al. |
| 2012/0230337 A1* | 9/2012 | Lee et al. .................... 370/392 |
| 2013/0114583 A1* | 5/2013 | Park et al. ................... 370/338 |
| 2013/0238919 A1 | 9/2013 | Ponmudi et al. |
| 2013/0301441 A1 | 11/2013 | Russell et al. |
| 2013/0301569 A1 | 11/2013 | Wang et al. |
| 2014/0050133 A1 | 2/2014 | Jafarian et al. |
| 2014/0126442 A1 | 5/2014 | Jafarian et al. |

* cited by examiner

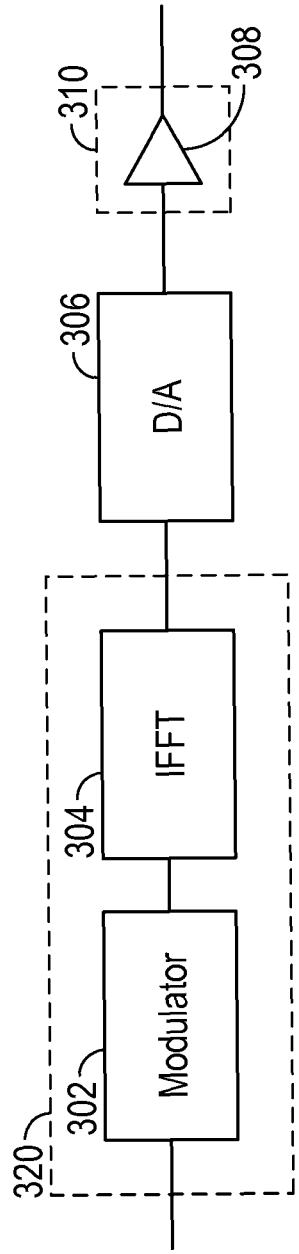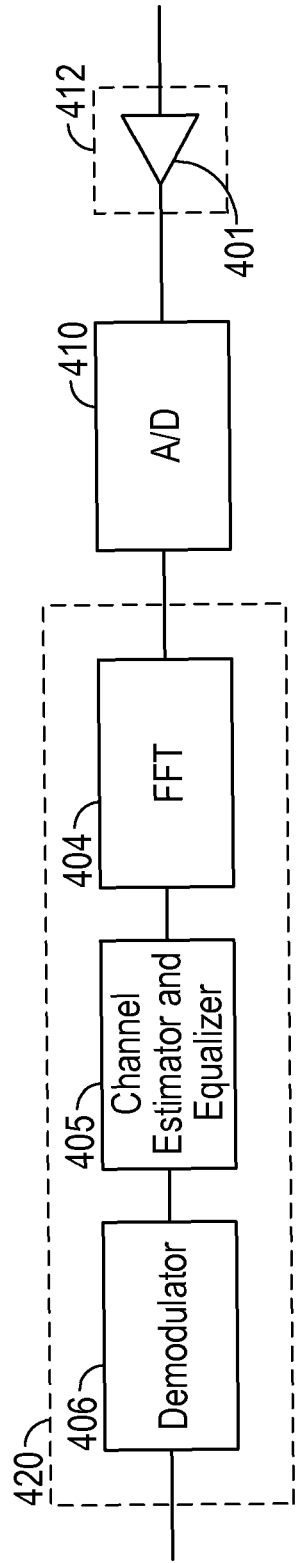

| 1011 | 1012 | 1013 | 1014 | 1015 | 1016 | 1017 | 1018 | 1019 | 1020 | 1021 |
|---|---|---|---|---|---|---|---|---|---|---|
| Protocol Version | Type | Subtype | To DS | From DS | More Fragments | Retry | Power Management | More Data | Protected Frame | Order |
| 2 | 2 | 4 | 1 | 1 | 1 | 1 | 1 | 1 | 1 | 1 |

Bits:

FIG. 10

SYSTEMS AND METHODS FOR LOW POWER OPERATIONS ON WIRELESS NETWORKS

CROSS REFERENCE TO RELATED APPLICATIONS

This application claims the benefit of U.S. Provisional Applications 61/717,851, 61/719,356, and 61/719,358. Application 61/717,851 was filed on Oct. 24, 2012. Applications 61/719,356 and 61/719,358 were filed on Oct. 26, 2012. The title for all three applications is "SYSTEMS AND METHODS FOR LOW POWER OPERATIONS ON WIRELESS NETWORKS." The disclosures of these three applications are hereby incorporated by reference in their entirety.

TECHNICAL FIELD

The present application relates generally to wireless communications, and more specifically to systems, methods, and devices to enable low power wireless communication.

BACKGROUND

Wireless networks enable communication with mobile devices, including those in ad-hoc networks. Wireless networks facilitate rapid field deployment, when compared to fixed wired networks. While wireless networks have their advantages, devices on wireless networks may consume a large amount of power during packet reception or while waiting to receive packets. Systems, methods, and devices that reduce power consumption may increase the time between battery charges and may reduce operational costs.

Communication standards incorporate power saving approaches to meet this need. For example, IEEE 802.11 power saving mode (PSM) defines two different power modes under which stations operate: active mode and regular power save (PS) mode. Stations in active mode may receive frames at any time. When in active mode, a station's primary receiver operates in an awake state, with sufficient power to receive frames.

Stations in regular PS mode may receive frames when their receivers are in an awake state. Stations in regular PS mode conserve power by transitioning to a lower power state (doze state) which usually consumes at least an order of magnitude less power than active state. When in doze state, the receiver does not operate with sufficient power to receive frames. In regular PS mode, all nodes in the network are synchronized to transition to wake up (transition to active state) to listen to beacon messages.

Broadcast, multicast or unicast messages to a power saving station are buffered at the transmitter and announced during the period when the nodes are in an awake state. The announcement is made using an ad hoc traffic indication message (ATIM) during a small time interval at the beginning of the beacon interval called the ATIM window. If a station receives a directed ATIM frame in the ATIM window, it sends an acknowledgement and stays awake for the entire beacon interval waiting for data packets to be transmitted. Immediately after the ATIM window, an access point can transmit buffered broadcast frames, multicast frames, data packets, and management frames addressed to stations that are known to be active based on previously received acknowledgements. Otherwise, the station may switch to the low-power doze state to conserve energy. In IEEE 802.11, a station's power management mode is indicated in the frame control field of the media access control header for each packet.

In regular PS mode, stations conserve power by transitioning to doze state most of the time, except for short intervals agreed with the transmitter when signals may be sent from the transmitter to the receiver. This is neither flexible nor efficient because in certain applications, the traffic pattern is unpredictable. The agreed awake time may not match the traffic pattern, so some awake times may not correspond to transmit times. There may also be times when transmitted signals are not received because they are transmitted outside of the agreed awake time.

Existing power save modes like 802.11 regular PS mode can be improved upon to further reduce power consumption. By further reducing power consumed by devices when waiting to receive packets or when receiving packets, power would be further conserved and operational costs further reduced.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure is a method of communicating on a wireless network. The method includes transmitting by a station a first message on the wireless network, the first message indicating the station is operating in one of at least three power management modes. The indication is communicated in a power management portion of a frame control field of a media access control header, wherein the power management portion comprises more than one bit. The method also includes operating the station in a power management state in accordance with the indicated power management mode.

In some aspects of the method, operating the station in a power management state in accordance with a first of the at least three power management modes includes operating a first receiver in two receiver states during the power management state that is in accordance with the first power management mode. In a first of the two receiver states, the first receiver is configured to not receive frames from the wireless network. In a second of the two receiver states, the first receiver is configured to receive one or more frames from the wireless network. The receiver is switched from the first receiver state to the second receiver state in response to a second receiver receiving a message from the wireless network. The first receiver consumes less power in the first receiver state than in the second state.

In some aspects of the method, the first receiver operates in the second receiver state during a time period indicated by the message received by the second receiver. In some aspects, the message received by the second receiver is of shorter duration than frames received by the first receiver. In some aspects of the method, the message received by the second receiver is of lower energy than any frame received by the first receiver.

In some aspects of the method, operating the station in the power management state in accordance with the first of the at least three power management modes further includes determining one or more time intervals when the second receiver may receive a message, configuring the second receiver to not receive messages during times outside the one or more time intervals. The second receiver consumes less power when configured not to receive messages than when configured to receive messages. In some aspects, the one or more time intervals correspond to beacon intervals.

In some aspects of the method, operating the station in a power management state in accordance with a second of the at least three power-save power management modes includes operating the first receiver in the station in two different receiver states. In a first state of the two receiver states, the first receiver is configured to receive at least one frame during a time interval when an access point may transmit at least one frame to the station, and in a second state of the two receiver states, the receiver is configured to not receive frames. The first receiver is configured to consume less power when operating in the second receiver state than when operating in the first receiver state. In some of these aspects, the time interval is a beacon interval.

In some aspects of the method, operating the station in a power management state in accordance with a third of the at least three power management modes includes configuring the receiver to continuously receive one or more frames from the wireless network for the duration of the power management state in accordance with the active power management mode. In some further aspects of the method, the first power management mode is an ultra-low power mode, the second power management mode is a power-save mode, and the third power management mode is an active power management mode.

Another aspect of the disclosure is a method of communicating on a wireless network. The method includes receiving by an access point a first message indicating that at least one station is operating in one of at least three power management modes. The indication is communicated in a power management portion of a frame control field of a media access control header, wherein the power management portion comprises more than one bit. The method also includes communicating with the at least one station in accordance with the indicated mode.

Another aspect disclosed is an apparatus for communicating a power management mode of a station on a wireless network. The apparatus includes a transmitter configured to transmit a first message on the wireless network, the first message indicating one of at least three power management modes. The indication is communicated in a power management portion of a frame control field of a media access control header. The power management portion comprises more than one bit, and a processor configured to operate the apparatus in a power management state in accordance with the indicated power management mode.

Some aspects of the apparatus further include a first receiver and a second receiver. The processor is configured to operate the apparatus in a power management state in accordance with a first of the at least three power management modes by operating the first receiver in two receiver states during the power management state that is in accordance with the first power management mode. In a first of the two receiver states, the first receiver is configured to not receive frames from the wireless network. In a second of the two receiver states, the first receiver is configured to receive one or more frames from the wireless network. The receiver is switched from the first receiver state to the second receiver state in response to the second receiver receiving a message from the wireless network, and the first receiver consumes less power in the second receiver state than in the first receiver state. In some aspects of the apparatus, the processor is configured to operate the first receiver in the second receiver state during a time period indicated by the message received by the second receiver. In some other aspects of the apparatus, the message received by the second receiver is of shorter duration than frames received by the first receiver.

In some aspects, the message received by the second receiver is of lower energy than any frame received by the first receiver. In some aspects, the processor is further configured to operate the apparatus in the power management state in accordance with the first of the at least three power management modes by determining one or more time intervals when the second receiver may receive a message, and configuring the second receiver to not receive messages during times outside the one or more time intervals, wherein the second receiver consumes less power when configured not to receive messages than when configured to receive messages. In some aspects, the one or more time intervals correspond to beacon intervals.

In some aspects, the processor is configured to operate the station in a power management state in accordance with a second of the at least three power management modes by: operating the first receiver in the station in two different receiver states. In one of the two receiver states, the processor configures the first receiver to receive at least one frame during a time interval when an access point may transmit at least one frame to the station, and in a second of the two receiver states, the processor configures the first receiver to not receive frames, wherein the first receiver is configured to consume less power when operating in the second receiver state than when operating in the first receiver state. In some aspects, the time interval is a beacon interval.

In some aspects, the processor is configured to operate the station in a power management state in accordance with a third of the at least three power management modes by configuring the receiver to continuously receive one or more frames from the wireless network for the duration of the power management state in accordance with the active power management mode. In some aspects, the first power management mode is an ultra-low power mode, the second power management mode is a power-save mode, and the third power management mode is an active power management mode.

Another aspect disclosed is an apparatus for communicating a power management mode of a station on a wireless network. The apparatus includes means for transmitting by a station a first message on the wireless network, the first message indicating one of at least three power management modes. The indication is communicated in a power management portion of a frame control field of a media access control header. The power management portion includes more than one bit, and means for operating the station in a power management state in accordance with the indicated power management mode.

In some aspects, the means for operating the station in a power management state in accordance with the indicated power management mode is configured to operate the station in accordance with a first of the at least three power management modes by: operating a first receiver in two receiver states during the power management state that is in accordance with the first power management mode. In a first of the two receiver states, the first receiver is configured to not receive frames from the wireless network. In a second of the two receiver states, the first receiver is configured to receive one or more frames from the wireless network. The receiver is switched from the first receiver state to the second receiver state in response to a second receiver receiving a message from the wireless network, and the first receiver consumes less power in the first receiver state than in the second receiver state.

In some aspects, the means for operating the station in a power management state in accordance with the indicated power management mode is further configured to operate the station in accordance with the first of the at least three power management modes by operating the first receiver in the second receiver state during a time period indicated by the message received by the second receiver. In some aspects, the message received by the second receiver is of shorter duration than frames received by the first receiver. In some aspects, the message received by the second receiver is of lower energy than any frame received by the first receiver.

In some aspects, the means for operating the station in a power management state in accordance with the indicated power management mode is further configured to operate the station in accordance with the first of the at least three power management modes by: determining one or more time intervals when the second receiver may receive a message, and configuring the second receiver to not receive messages during times outside the one or more time intervals. The second receiver consumes less power when configured not to receive messages than when configured to receive messages. In some aspects, the one or more time intervals correspond to beacon intervals.

In some aspects, the means for operating the station in a power management state in accordance with the indicated power management mode is configured to operate the station in accordance with a second of the at least three power management modes by: operating the first receiver in the station in two different receiver states. In one of the two receiver states, the first receiver is configured to receive at least one frame during a time interval when an access point may transmit at least one frame to the station, and in a second of the two receiver states, the receiver is configured to not receive frames. The first receiver is configured to consume less power when operating in the second receiver state than when operating in the first receiver state. In some aspects, the time interval is a beacon interval.

In some aspects, the means for operating the station in a power management state in accordance with the indicated power management mode is configured to operate the station in accordance with a third of the at least three power management modes by configuring the receiver to continuously receive one or more frames from the wireless network for the duration of the power management state in accordance with the active power management mode. In some aspects, the first power management mode is an ultra-low power mode, the second power management mode is a power-save mode, and the third power management mode is an active power management mode.

Another aspect disclosed is a station for communicating on a wireless network. The station includes a processor configured to generate a first message indicating the station is operating in one of at least three power management modes. The indication is contained in a power management portion of a frame control field of a media access control header, wherein the power management portion comprises more than one bit. The processor is further configured to operate the station in a power management state in accordance with the indicated power management mode. The method also includes a first receiver configured to receive at least one frame when operating in a first state. The method also includes a transmitter configured to transmit the message on the wireless network.

Another aspect of the disclosure is an access point for communicating on a wireless network. The access point includes a receiver configured to receive a first message. The access point also includes a processor configured to interpret the first message. The first message indicates that at least one station is operating in one of at least three power management modes. The indication is communicated in a power management portion of a frame control field of a media access control header, wherein the power management portion comprises more than one bit. The processor is configured to communicate with the at least one station in accordance with the indicated mode.

Another aspect of the disclosure is a station for communicating on a wireless network. The station includes means for transmitting a first message on the wireless network, the first message indicating the station is operating in one of at least three power management modes. The indication is communicated in a power management portion of a frame control field of a media access control header, wherein the power management portion comprises more than one bit. The station also includes means for operating the station in a power management state in accordance with the indicated power management mode.

Another aspect of the disclosure is an access point for communicating on a wireless network. The access point includes means for receiving a first message, the first message indicating that at least one station is operating in one of at least three power management modes. The indication is communicated in a power management portion of a frame control field of a media access control header, wherein the power management portion comprises more than one bit. The access point also includes means for communicating with the at least one station in accordance with the indicated mode.

Another aspect disclosed is a computer readable storage medium including instructions that when executed cause a processor to perform a method of communicating a power management mode of a station on a wireless network. The method includes transmitting by a station a first message on the wireless network, the first message indicating one of at least three power management modes, wherein the indication is communicated in a power management portion of a frame control field of a media access control header, wherein the power management portion comprises more than one bit, and operating the station in a power management state in accordance with the indicated power management mode.

In some aspects, operating the station in a power management state in accordance with a first of the at least three power management modes includes operating a first receiver in two receiver states during the power management state that is in accordance with the first power management mode. In a first of the two receiver states, the first receiver is configured to not receive frames from the wireless network. In a second of the two receiver states, the first receiver is configured to receive one or more frames from the wireless network. The receiver is switched from the first receiver state to the second receiver state in response to a second receiver receiving a message from the wireless network, and the first receiver consumes less power in the first receiver state than in the second receiver state.

In some aspects, the first receiver operates in the second receiver state during a time period indicated by the message received by the second receiver. In some aspects, the message received by the second receiver is of shorter duration than frames received by the first receiver. In some aspects, the message received by the second receiver is of lower energy than any frame received by the first receiver. In some aspects, operating the station in the power management state in accordance with the first of the at least three power management modes further includes determining one or more time intervals when the second receiver may receive a message, configuring the second receiver to not receive messages during times outside the one or more time intervals. The second receiver consumes less power when configured not to receive messages than when configured to receive messages. In some aspects, the one or more time intervals correspond to beacon intervals.

In some aspects, operating the station in a power management state in accordance with a second of the at least three power management modes includes operating the first receiver in the station in two different receiver states. In one of the two receiver states, the first receiver is configured to receive at least one frame during a time interval when an access point may transmit at least one frame to the station, and in a second of the two receiver states, the receiver is configured to not receive frames. The first receiver is configured to consume less power when operating in the second receiver state than when operating in the first receiver state. In some aspects, the time interval is a beacon interval.

In some aspects, operating the station in a power management state in accordance with a third of the at least three power management modes includes configuring the receiver to continuously receive one or more frames from the wireless network for the duration of the power management state in accordance with the active power management mode. In some aspects, the first power management mode is an ultra-low power mode, the second power management mode is a power-save mode, and the third power management mode is an active power management mode.

Another aspect disclosed is a computer readable storage medium comprising instructions that when executed cause a processor to perform a method of receiving a power management mode of a station on a wireless network. The method includes receiving a first message, the first message indicating that a station is operating in one of at least three power management modes, wherein the indication is communicated in a power management portion of a frame control field of a media access control header, wherein the power management portion comprises more than one bit; and communicating with the station in accordance with the indicated mode.

BRIEF DESCRIPTION OF THE DRAWINGS

FIG. 3 shows a functional block diagram of exemplary components that may be used in the wireless device of FIG. 2A to transmit wireless communications.

FIG. 4 shows a functional block diagram of exemplary components that may be used in the wireless device of FIG. 2A to receive wireless communications.

FIG. 10 shows an exemplary structure of a frame control field 810 and 910 of the MAC headers 802 and 903 shown in FIGS. 8 and 9 respectively.

Figure 1:
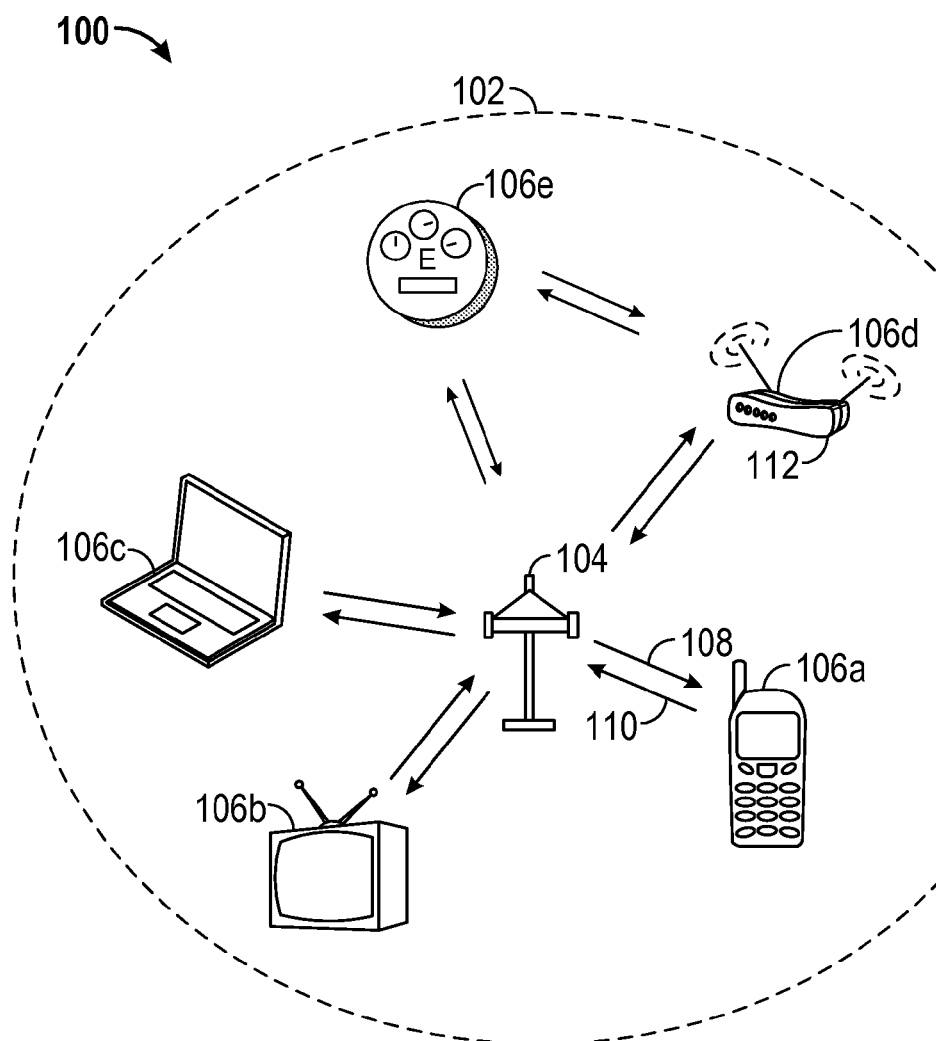
FIG. 1 illustrates an example of a wireless communication system in which aspects of the present disclosure may be employed.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

IEEE 802.11 power saving mode (PSM) defines two different power modes under which stations operate: active mode and regular power save (PS) mode. Active mode is "always on" and doesn't seek to conserve power. Regular PS mode reduces power consumption when compared to active mode. As introduced in the Background section above, regular PS mode is not robust to unpredictable traffic patterns.

This disclosure introduces a third mode, power save with ultra low power (PS-ULP) mode, that is more robust to unpredictable traffic patterns. The PS-ULP mode reduces power consumption further than regular PS mode. This disclosure also introduces use of a low power secondary receiver 228 that triggers a primary receiver 212, to reduce power consumed when waiting for incoming packets or when receiving incoming packets.

In PS-ULP mode, the primary receiver 212 stays in doze state until a trigger event such as a wake-up signal triggers the primary receiver 212 to transition to the awake state. For some implementations, a simple low power receiver 228 receives wake-up signals. The low power receiver 228 consumes less energy than the primary receiver 212 because it is designed to receive a defined set of short duration, pages (short paging messages, ultra low power messages, wake up message, or wake-up packets) as compared to the set of signals the primary receiver 212 is designed to receive.

In some implementations, the primary receiver 212 and low power receiver 228 are in separate modules, in other implementation, circuitry for the two receivers are in the same module.

In some implementation, a station's primary receiver 212 is in doze state. A transmitter of an access point or other station wirelessly sends a page to the station's low power receiver 228. The station's low power receiver 228 receives the page and performs some action. The action may be to wake-up the station's primary receiver 212 (either immediately or at a specified time or time delay) to an awake state such that the station's primary receiver 212 can receive data. In some cases, the station then sends a message to inform an access point or another station that it is awake. Then, an access point or station may send data to the station's primary receiver 212, and it is received and processed by the station.

The low power receiver 228 may transition between two operational states. The low power receiver 228 is in ULP-awake state when the wake-up circuit 230 is on and the station is able to receive ULP signals. The low power receiver 228 is in ULP-doze state when the wake-up circuit 230 is in a sleep or lower power state and not able to receive ULP signals. These states may be independent of the state of the primary receiver 212. In some protocols, they are not independent.

Most implementations using PS-ULP mode operate in a plurality of states for the primary receiver 212 when the device is powered on, such as active and doze. The plurality of states for the low power receiver 228 typically is ULP-awake and ULP-doze.

Different combinations of primary receiver 212 states and low power receiver 228 states are possible. For certain implementations, stations are either in primary receiver 212 awake state with ULP-doze state, primary receiver 212 doze state with ULP-awake state, or primary receiver 212 doze state with ULP-doze state. For other implementations, stations are either in primary receiver 212 awake state with ULP-doze state, or primary receiver 212 doze state with ULP-awake state. For other implementations, stations are either in primary receiver 212 awake state with ULP-doze state, primary receiver 212 awake state with ULP-awake state, primary receiver 212 doze state with ULP-doze state, or primary receiver 212 doze state with ULP-awake state. Other implementations may use other combinations of these or similar states.

The state of a station may be represented with two bits. The first bit indicates whether the primary receiver 212 is awake or in doze state. The second bit corresponds to whether the low power receiver 228 is in ULP-awake or ULP-doze state. A station may indicate to a peer or access point which power management mode it is using through a management frame or similar means. If both receivers are in a doze state, they would not receive messages. At least one receiver needs to be in an awake state to receive messages. When in PS-ULP mode, the station uses wakeup signals to trigger the primary receiver 212. Existing protocols and mechanisms may be adapted for PS-ULP mode. Examples include regular PS, U-APSD, S-APSD, TDLS-PS, and TWT.

In some implementations, power management mode transitions such as transitions between active mode and regular PS mode, or between regular PS mode and PS-ULP mode, are accomplished using the same mechanisms found in existing standards. Transitions may be communicated between access point and station using the power management (PM) bit in the frame control field of media access control headers, for which PM=1 when the station is entering PS mode. It may be necessary to increase the number of PM bits to two or more to allow the station to explicitly indicate one of three power save modes; for example, active, regular PS, or PS-ULP. For frames that do not have the PM bit, such as an ACK frame consisting only of a PHY preamble, alternative bits may be defined.

In some implementations, one or more additional wireless messages may redefine the use of the power management bit. For example, a message may redefine the power management field to indicate operation in a third power management mode when set to a value, when a communication standard indicates the power management field indicates a second power management mode when set to the value. Another new message may reset the definition of the power management field to conform to the communication standard. These new messages may be separate messages using different subtype values in a MAC header. Alternatively, these new messages may be distinguished via information elements included in a single new message, identified by a new MAC subtype field value. In another implementation, the enhanced capabilities information element may indicate how the power management field is interpreted by a receiving device, such as an access point.

This disclosure identifies mechanisms for ultra low power (ULP) wakeup techniques. These techniques operate with various communications protocols, such as 802.11. This disclosure identifies protocols for the use of page in conjunction with PS-ULP mode protocol. This disclosure describes potential timing of the pages with respect to beacons, and related setup signaling. This disclosure also describes state transitions of the station depending on some combination of initial state, power management mode (for example, PS-ULP mode), and signals received or transmitted.

In such implementations, the format, content, and definition of the transmitted and received pages that are received by the low power receiver 228 of a wireless device 202 are known by the transmitting and receiving wireless devices so that the receiving device can identify and parse incoming pages. In some implementations, the access point or other station would send a page at certain target times and/or time intervals. In some implementations, the receiving station can use a simple low power receiver 228 designed to receive certain pages of expected configurations and content. Receiving stations may be further configured to reduce additional power consumption by a power saving scheme that places the wake-up circuit in different operational states of ULP-awake or ULP-doze.

For some implementations, power is conserved by maximizing the time analog and digital circuits are in an off or sleep state. Different circuits within the wireless device may be in different states. For example, the regular data receiver 212 may be in doze state, while a low power receiver 228 may be awake to receive pages.

For some implementations, the RF wake-up circuit 230 selectively receives a particular RF signal structure. When detected, the RF wake-up circuit 230 activates the station's receivers 212. These receivers 212 may contain analog and/or digital circuitry.

In some implementations, state transitions are not instantaneous. For example, it may take several hundred microseconds to wake-up a primary receiver 212, largely due to phase locked loop convergence time, loading of calibration coefficients, and time to load registers. When the primary receiver 212 is fully powered off, wake-up time could take several milliseconds. In some implementations, sufficient time is allocated and medium reserved to allow for state transition time.

In some implementations, the low power receiver 228 is a separate module from the receiver 212 or transceiver 214. In other implementations, they are in the same module.

In some implementations, the wake-up circuit 230 may not be active all times; wake-up circuit 230 typically needs to be cycled off periodically. The wake-up circuit 230 duty cycle may be defined by a device. This duty cycle may be the same, shifted, or unrelated to the duty cycle of the transceiver 214 or other components or modules.

This disclosure describes protocols that enable the access point and station to coordinate and communicate state transitions. Some aspects of these protocols are integrated with existing power save mode mechanisms. This reduces changes to existing specifications.

In some implementations pages coexist with beacons. They may be repeated with the same or a different duty cycle as beacons. In other implementations, pages may replace beacons.

In some implementations, pages include duration parameters that can be used to reduce contention. For example, timeslots can be dedicated to one or several stations for uplink and/or downlink transmissions during the period of duration, or other purposes during the duration set, during the wake-up protocol.

In some implementations, pages instruct wireless devices to transition the primary receiver 212 to sleep. This reduces battery consumption, and may be used when the access point does not have any buffered units (BUs) for the station.

Wireless devices including access points may send pages for timing synchronization with one or more devices including stations. For example, a page with a "no data" message can be sent for synchronization.

Pages sent between wireless devices may also provide information about the communications medium, changes in protocol, changes in identification parameters, changes in the target beacon transit time (TBTT), or other similar information.

In some implementations, wireless network technologies include various types of wireless local area networks, municipal area networks, wide area networks, or personal area networks. Wireless networks interconnect devices using standard networking protocols such as Wi-Fi or, more generally, any member of the IEEE 802.11 family of wireless protocols. Aspects described herein may interoperate with or be used as part of the IEEE 802.11ah protocol. They may use sub-gigahertz bands. Signals may be transmitted using orthogonal frequency-division multiplexing (OFDM), direct-sequence spread spectrum (DSSS) communications, a combination of OFDM and DSSS communications, or other schemes. A wide variety of other bands and wireless protocols are contemplated by the implementations described herein.

Implementations described herein may be used for sensors, metering, and smart grid networks. Some implementations include wireless devices that consume less power than devices implementing other wireless protocols. Some implementations may be configured to transmit wireless signals across a relatively long range, for example one kilometer or longer. Energy storage devices provide power for certain implementations; in some cases, the energy storage device operates without replacement for months or years.

Certain devices described herein implement Multiple Input Multiple Output (MIMO) technology. A MIMO system employs multiple ($N_T$) transmit antennas and multiple ($N_R$) receive antennas for data transmission. A MIMO channel formed by the $N_T$ transmit and $N_R$ receive antennas is decomposed into $N_S$ independent channels (also referred to as spatial channels or streams) where $N_S \leq \min\{N_T, N_R\}$. Each of the $N_S$ independent channels corresponds to a dimension. The MIMO system improved performance with higher throughput and/or greater reliability if the additional dimensionalities created by the multiple transmit and receive antennas are used.

In some implementations, a wireless network includes devices that access the wireless network, such as access points and stations. Access points serve as hubs or base stations for the wireless network. Stations use the network. An access point may comprise, be implemented as, or known as, a NodeB, radio network controller, eNodeB, base station controller, base transceiver station, base station, transceiver function, radio router, radio transceiver, or some other terminology.

Stations may connect to an access point via a Wi-Fi (e.g., IEEE 802.11 protocol) compliant wireless link to connect to the Internet or other networks. In some implementations stations are used as access points. Station types include mobile phones, tablet computers, laptop computers, and personal digital assistants. A station may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal comprises a cellular telephone, a cordless telephone, a session initiation protocol phone, a wireless local loop station, a personal digital assistant, a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device (e.g., a tablet computer), a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices described herein, whether used as a station, access point, or other device, may be used for smart metering, home automation, personal healthcare, surveillance, or implementing machine-to-machine communications. They may be used in a smart grid network, as a sensor, or in a healthcare context. They may be used to enable extended-range Internet connectivity (e.g., with hotspots.).

FIG. 1 illustrates an example of a wireless communication system 100 in which aspects of the present disclosure may be employed. The wireless communication system 100 operates pursuant to a wireless standard, such as 802.11. Wireless communication system 100 includes access point 104 and communicates with stations 106a, 106b, 106c, 106d, and 106e (collectively stations 106).

In some implementations, station 106d is configured as relay 112 to relay communications between station 106e and access point 104. This enables communication between devices that are out of range or otherwise unable to communicate with each other.

Access point 104 and stations 106 may transmit signals using a variety of processes and methods. OFDM/OFDMA implementations send and receive signals orthogonal frequency division multiplexing (OFDM) or orthogonal frequency division multiple access (OFDMA) techniques. CDMA implementations send and receive signals using code division multiple access (CDMA) techniques.

Downlink (DL) 108 communication links facilitate transmission from the access point 104 to one or more stations 106. Uplink (UL) 110 communication links facilitate transmission from one or more stations 106 to access point 104. Downlink 108 may be referred to as a forward link or a forward channel. Uplink 110 may be referred to as a reverse link or a reverse channel.

In some implementations, access point 104 provides wireless communication coverage to a basic service area 102. In some implementations, wireless communication system 100 functions as a peer-to-peer network among stations 106. Accordingly, the functions of the access point 104 described herein may alternatively be performed by one or more of the stations 106.

Figure 2A:
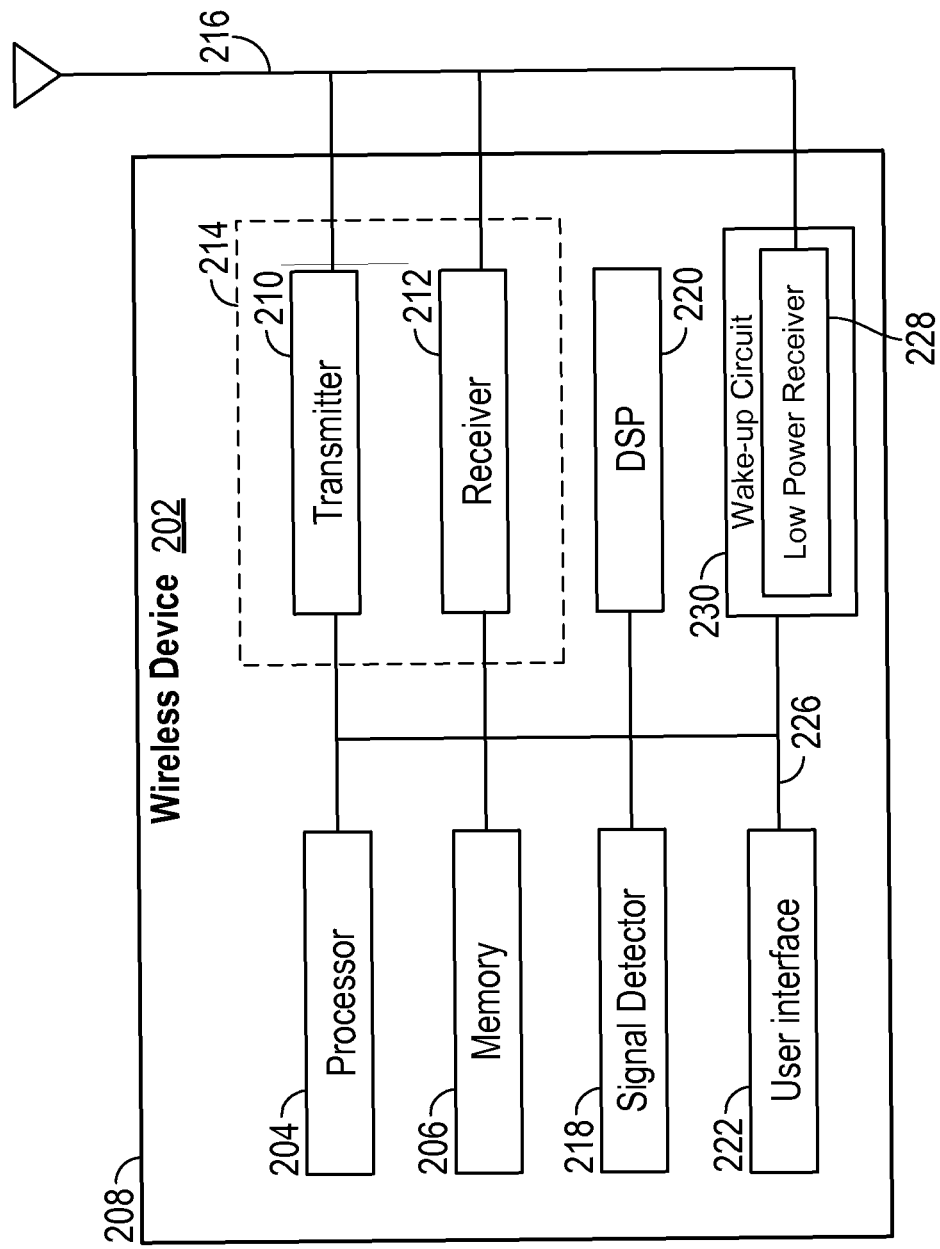
FIG. 2A shows a functional block diagram of an exemplary wireless device that may be employed within the wireless communication system of FIG. 1.

FIG. 2A illustrates various components that may be used in exemplary wireless device 202 within wireless communication system 100 to implement the various methods described herein. Wireless device 202 may comprise access point 104, or one of the stations 106 of FIG. 1.

In some implementations, wireless device 202 includes processor 204 which controls operation of wireless device 202. Memory 206, may include both read-only memory and random access memory. Memory 206 provides instructions and data to processor 204. A portion of the memory 206 may also include non-volatile random access memory. Processor 204 typically performs logical and arithmetic operations based on program instructions stored within memory 206. Instructions in memory 206 may be executable to implement methods described herein.

In some implementations, wireless device 202 is implemented or used as a transmitting node. Processor 204 is configured to select one of a plurality of media access control (MAC) header types, to generate a packet having that MAC header type. For example, processor 204 may be configured to generate a packet comprising a MAC header and a payload, and configured to determine what type of MAC header to use.

When the wireless device 202 is implemented or used as a receiving node, processor 204 is configured to process packets of a plurality of different MAC header types. For example, the processor 204 may be configured to determine the type of MAC header used in a packet and process the packet and/or fields of the MAC header.

Processor 204 may comprise or be a component of a processing system implemented with one or more processors. The one or more processors may be implemented with any combination of general-purpose microprocessors, microcontrollers, digital signal processors, field programmable gate arrays, programmable logic devices, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may include housing 208 that may include a transmitter 210 and a receiver 212 to allow transmission and reception of data between the wireless device 202 and a remote location. Transmitter 210 and receiver 212 may be combined into a transceiver 214. Antenna 216 may be attached to the housing 208 and electrically coupled to the transceiver 214. Wireless device 202 may also include (not shown) multiple transmitters, multiple receivers, multiple transceivers, and/or multiple antennas.

Transmitter 210 may be configured to wirelessly transmit packets having different MAC header types. For example, transmitter 210 may be configured to transmit packets with different types of headers generated by processor 204.

Receiver 212 may be configured to wirelessly receive packets having different MAC header types. In some aspects, the receiver 212 is configured to detect a type of a MAC header used and process the packet accordingly.

Wireless device 202 may include signal detector 218 to detect and quantify the level of signals received by receiver 212. Signal detector 218 may detect such signals as total energy, energy per subcarrier per symbol, power spectral density and other signals. The wireless device 202 may also include a digital signal processor (DSP) 220 to process signals. The DSP 220 may be configured to generate a data unit for transmission. In some aspects, the data unit may comprise a physical layer data unit (PPDU). In some aspects, the PPDU is referred to as a packet.

Wireless device 202 may further comprise a wake-up circuit 230 comprising a second, low power receiver 228. In one aspect, the low power receiver 228 may be configured to consume power that is lower than power normally consumed by the receiver 214 during operation. Low power receiver 228 may be configured to consume on the order of 10×, 20×, 50× or 100× (or more) less power when operating as compared to receiver 212. In one aspect, low power receiver 228 may be configured to receive signals using on-off keying (OOK) or frequency-shift keying (FSK) modulation/demodulation techniques. In contrast, receiver 212 that may be configured to receive signals using OFDM or other comparable techniques. A station 106 that is a wireless device 202 having the low power receiver 228 may be referred to herein as a low power receiver station 106e. Other stations that may not include the low power receiver 228 or may be operating in a mode where the receiver 212 or transceiver 214 is activated may be referred to herein as a station 106.

Wireless device 202 may further comprise user interface 222 in some aspects. User interface 222 comprises user input components and output components that convey information to users. Examples include keypads, touchscreens, displays, microphones, speakers, and haptic devices.

The various components of wireless device 202 may be coupled together by bus system 226. The bus system 226 may include one or more data bus, a power bus, a control signal bus, and status signal bus. Those of skill in the art will appreciate that components of wireless device 202 may be coupled together or accept or provide inputs to each other using some other mechanism.

Although a number of separate components are illustrated in FIG. 2A, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2A may be implemented using a plurality of separate elements. Furthermore, the processor 204 may be used to implement any of the components, modules, circuits, or the like described below, or each may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

Figure 2B:
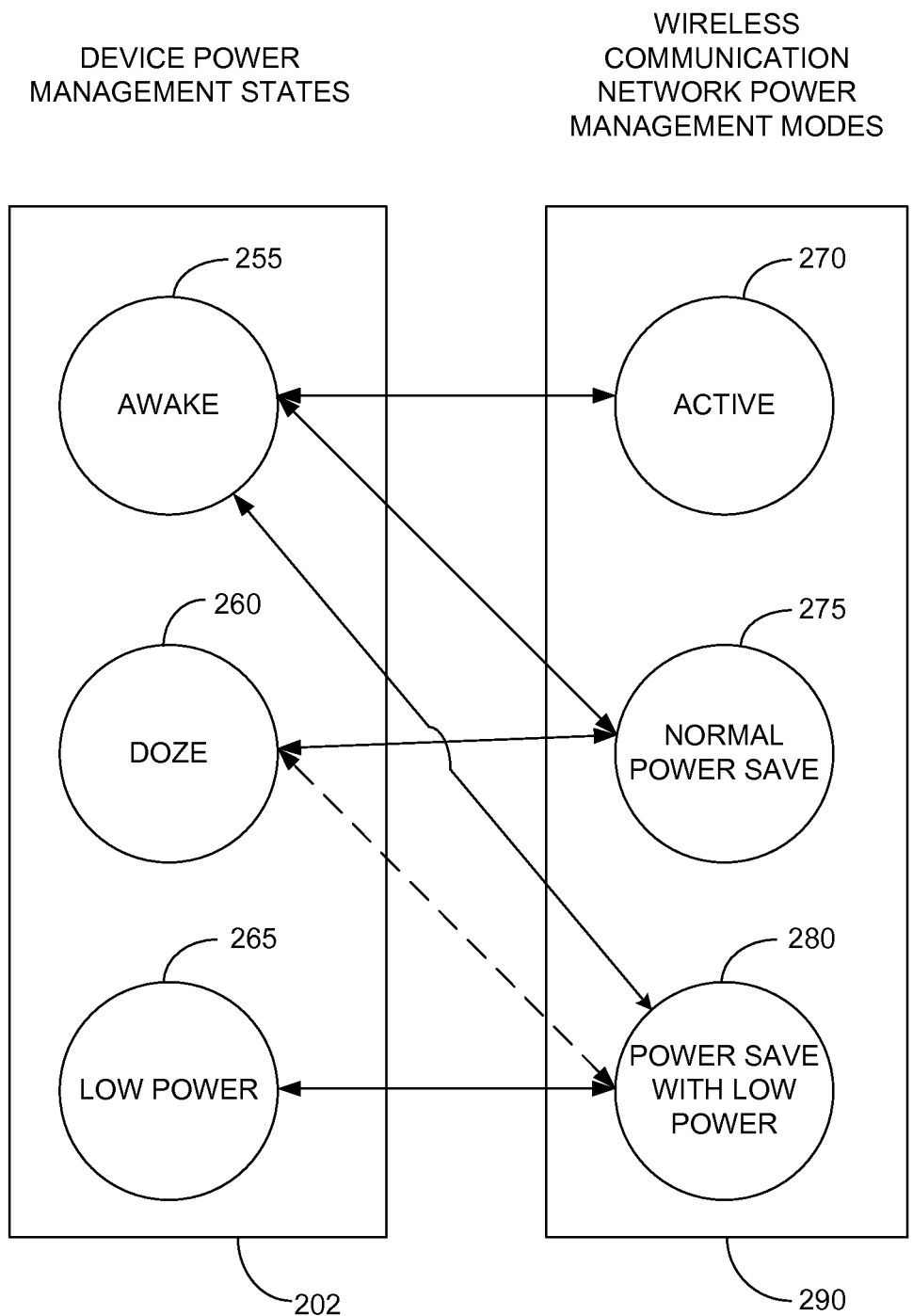
FIG. 2B illustrates one implementation of a mapping of operational device power management states to operational network power management modes.

FIG. 2B illustrates one implementation of a mapping of operational device states to operation network power management modes. An arrow between a device state and a network power management mode indicates that the device 202 may be in the device state when the network is in the network power management mode. In one implementation, dashed lines are not implemented.

As discussed above, the wireless device 202 may comprise an access point 104, a station 106, or a low power receiver station 106e. The wireless device 202 may support a plurality of operational network power management modes. For example, the wireless device 202 may support a first operational network mode referred to as an active mode 270. In the active mode, the wireless device 202 may always be in an "awake" state 255 and actively transmit/receive data with the access point 104. The device 202 may also be ready to receive packets from a wireless network when in the "awake" state 255. When the network is in the active power management state 270, it may send data packets to the device 202. Further, the wireless device 202 may have a second operational network mode referred to as a normal power save mode 275. In the normal power save mode 275, the wireless device 202 may be in the "awake" state 255 or a "doze" or "sleep" state 260 where the wireless device 202 does not actively transmit/receive data with the access point 104. For example, the receiver 212 and possibly DSP 220 and signal detector 218 of the wireless device 202 may operate using reduced power consumption in the doze state. Further, in the network normal power save mode 275, the wireless device 202 may occasionally enter the awake state to listen to messages from the access point 104 (e.g., pages) that indicate to the wireless device 202 whether or not the wireless device 202 needs to "wake up" (e.g., enter the awake state) at a certain time so as to be able to transmit/receive data with the access point 104.

Accordingly, in certain wireless communication systems 100, the access point 104 may transmit pages to a plurality of wireless devices 202 in a network normal power save mode 275 in the same network as the access point 104, indicating whether or not there is data buffered at the access point 104 for the wireless devices 202. The wireless devices 202 may also use this information to determine whether they need to be in an awake state 255 or a doze state 260. For example, if a wireless device 202 determines it is not being paged, it may enter the doze state 260. Alternatively, if the wireless device 202 determines it may be paged, the wireless device 202 may enter the awake state 255 for a certain period of time to receive the page and further determine when to be in an awake state 255 based on the page. Further, the wireless device 202 may stay in the awake state 255 for a certain period of time after receiving the page. In another example, the wireless device 202 may be configured to function in other ways when being paged or not being paged that are consistent with this disclosure.

In some aspects, pages may include a bitmap (not shown in this figure), such as a traffic identification map (TIM). In certain such aspects, the bitmap may include a number of bits. These pages may be sent from the access point 104 to wireless devices 202 in a beacon or a TIM frame. Each bit in the bitmap may correspond to a particular wireless device 202 of a plurality of wireless devices 202, and the value of each bit (e.g., 0 or 1) may indicate the state the corresponding wireless device 202 should be in (e.g., doze state or awake state) to be able to receive Buffered Units (BUs) that the access point 104 has for that particular wireless device 202. Accordingly, the size of the bitmap may be directly proportional to the number of stations 106 in the wireless communications system 100. Therefore, a large number of wireless devices 202 in the wireless communications system 100 may result in a large bitmap.

In some aspects, wireless devices 202 that sleep for a long time may not wake up to read any TIM messages. For example, a wireless device 202 can decide to sleep through one or more TIM messages in an extended sleep mode. In this case, the wireless device 202 may advertise to the access point 104 that the wireless device 202 may not read any TIM messages. Accordingly, the access point 104 may not include the corresponding identifiers in the TIM message. In various implementations, the wireless devices 202 can notify the access point 104 that they may not wake up for one or more TIM messages (i.e., that they are operating in the aforementioned power management mode) using a control message, or immediately during association.

For wireless devices 202 that have notified the access point 104 in this manner, the access point 104 may not include identifiers in the TIM message, even when it has BUs intended for them. Wireless devices 202 may claim their BUs by sending a PS-Poll at any time to the access point 104. In an implementation, access point 104 may immediately send the BU in response to the PS-Poll. In another implementation, the access point 104 may respond to the PS-Poll with an acknowledgement (ACK), and deliver the BU at a later time. In yet another implementation, the access point 104 may not immediately respond (neither with ACK nor with BU) to a PS-Poll.

The access point 104 may instead reply with a cumulative ACK frame sent after a given scheduled time after the TIM message.

In various implementations, the wireless device 202 can specify the waiting time to deliver the BU via the PS-Poll (for a dynamic indication), an association request, a probe request, and/or another management frame sent to the access point (for a static indication). In other implementations, the access point 104 can specify the waiting time to deliver the BU via an acknowledgement (ACK or ack) frame, a TIM element (for a dynamic indication), a beacon, an association response, a probe response, or other management frames sent to the station 106 (for a static indication). The wireless device 202 may go to sleep for the waiting time duration. The wireless device 202 may acknowledge correct reception of the BU by sending an ACK. The wireless device 202 may then go back to sleep.

FIG. 3 illustrates various components that may be utilized in the wireless device 202t to transmit wireless communications. The components illustrated in FIG. 3 may be used, for example, to transmit OFDM communications.

The wireless device 202t of FIG. 3 may comprise a modulator 302 configured to modulate bits for transmission. For example, the modulator 302 may determine a plurality of symbols from bits received from the processor 204 (FIG. 2A) or the user interface 222 (FIG. 2A), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304. It should be appreciated that the transform module 304 may be configured to operate according to additional modes where 128 points, 256 points, 512 points, and 1024 points are used, and the like.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202t (e.g., see description above with reference to FIG. 2A).

As discussed above, the DSP 320 may be configured to generate a data unit for transmission. In some aspects, the modulator 302 and the transform module 304 may be configured to generate a data unit comprising a plurality of fields including control information and a plurality of data symbols.

Returning to the description of FIG. 3, the wireless device 202 may further comprise a digital to analog converter 306 configured to convert the output of the transform module into an analog signal. For example, the time-domain output of the transform module 304 may be converted to a baseband OFDM signal by the digital to analog converter 306. The digital to analog converter 306 may be implemented in the processor 204 or in another element of the wireless device 202 of FIG. 2A. In some aspects, the digital to analog converter 306 is implemented in the transceiver 214 (FIG. 2A) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2A) and/or the DSP 320, for example using the modulator 302 and the transform module 304 as discussed above. Data units that may be generated and transmitted as discussed above are described in additional detail below.

FIG. 4 illustrates various components that may be used in the wireless device 202 of FIG. 2A to receive wireless communications. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 412 of wireless device 202b is configured to receive one or more packets or data units in a wireless signal. Data units that may be received and decoded or otherwise processed as discussed below.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises a low noise amplifier (LNA).

The wireless device 202r may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2A) or in another element of the wireless device 202r. In some aspects, the analog to digital converter 410 is implemented in the transceiver 214 (FIG. 2A) or in a data receive processor.

The wireless device 202r may further comprise a transform module 404 configured to convert the representation of the wireless signal into a frequency spectrum. In FIG. 4, the transform module 404 is illustrated as being implemented by a fast Fourier transform (PIT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses. It should be appreciated that the transform module 404 may be configured to operate according to additional modes where 128 points, 256 points, 512 points, and 1024 points are used, and the like.

The wireless device 202b may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 202t may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2A), or used to display or otherwise output information to the user interface 222 (FIG. 2A). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 (FIG. 2A) or in another element of the wireless device 202 (FIG. 2A).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2A) and/or the DSP 420 may be used to decode data symbols in the data units using the transform module 404, the channel estimator and equalizer 405, and the demodulator 406.

Data units exchanged by the access point 104 and the station 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a media access control (MAC) header or data for other layers, and/or user data, for example. The payload may be transmitted using one or more data symbols. The systems, methods, and devices herein may utilize data units with training fields whose peak-to-power ratio has been minimized.

The wireless device 202a shown in FIG. 3 illustrates an example of a single transmit chain to be transmitted over an antenna. The wireless device 202b shown in FIG. 4 shows an example of a single receive chain to be received over an antenna. In some implementations, the wireless device 202a or 202b may implement a portion of a MIMO system using multiple antennas to simultaneously transmit data.

Accordingly, certain implementations are directed to sending wireless signals using a variety of different bandwidths in different frequency ranges. For example, in one exemplary implementation, a symbol may be configured to be transmitted or received using a bandwidth of 1 MHz. The wireless device 202 of FIG. 2A may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width. In addition, additional modes or configuration are possible such as for example of using bandwidths of 20 MHz, 40 MHz, 80 MHz, and the like in the 2.4 GHz band or the 5 GHz. Band.

In a station 106, a significant source of power consumption may be due to the long time spent by the station 106 in receive mode, either during packet reception and especially during the time a receiver 212 is on and waiting to receive a packet. In battery operated stations, transmit power may be comparable to receive power, but receive time may be much longer than transmit time. Particularly when operating using a battery, it is desirable to reduce the awake time of stations to reduce power consumption. One way to reduce the awake time of a station 106 is to turn off the station receiver 212 for a majority of a time interval except for certain short intervals of time. In this case the transmitter 210 and receiver 212 may agree on the on/off cycle. In some cases, this may not be flexible or efficient. For example, in typical applications, the traffic pattern may not be predictable. In addition, the agreed awake time may not match the traffic pattern so some awake times may be useless. In addition, the traffic may come at times where station 106 is off and there may be no way to deliver the packet until the station 106 wakes up.

Referring back to FIG. 2B, in an implementation, station may be configured to operate in a low power state 265, illustrated in FIG. 2B, in addition to the "active" and "doze" states discussed above. In some implementations, the station may be configured to operate in only the awake or low power states. In an implementation, when in the low power state 265, the station may indicate that its operational network mode is a power save with low power mode 280. In an implementation, the low power state 265 may utilize the low power receiver 228 as described above to provide a low power receiver station 106e. In one aspect, the low power receiver station 106e may communicate with an access point 104. In this case, there may be an association (e.g., registration) procedure where certain information is exchanged between the low power receiver station 106e and the access point 104 to determine future communication parameters and activities. In another aspect, the low power receiver station 106e may communicate between other stations that are not associated with each other.

In one aspect, the low power receiver 228 may remain on substantially indefinitely while the low power receiver station 106e is in operation. In another aspect, the low power "wake up" receiver 228 may operate according to an on/off duty cycle as defined by a given schedule, to further reduce energy consumption. For example, the processor 204 or a controller (not shown) may regulate the schedule. Furthermore, the processor 204 may be configured to otherwise control when the low power receiver 228 listens for the wake-up signal for different durations and time periods (e.g., awake periods for example during business hours as compared to other sleep periods).

According to an implementation, to maximize sleep, the transceiver 214, analog and digital, may be configured to be off (e.g., powered down). The only circuit that is powered is the RF wake-up circuit 230. The low power receiver 228 of the RF wake-up circuit 230 may listen for a particular RF signal structure. When detected, the RF wake-up circuit 230 turns on or otherwise activates the transceiver 214, analog and digital. In some cases, the transceiver 214 and modem may take approximately 100-200 µs to wake-up (assuming transceiver 214 stays powered). The wake up time may be a function of PLL convergence time, loading of calibration coefficients, and other register loading. In some cases, wake-up time may be as large as approximately 2 ms if transceiver 214 is fully powered off as well. Thus, in one aspect, the wake-up packet may reserve a wireless medium for a time period for the receiver 212 to wake-up and start receiving data and include the special RF signal structure.

In some implementations, a low power receiver station 106e may not be associated with other stations. For examples the station 106e and other stations may not be associated with an access point and their interaction with each other is based on events and temporary proximity (e.g., asynchronous operation). For example, in a building, a battery operated small sensor is placed in each room. Each sensor may be configured as a low power receiver station 106e. As described above, the transceiver 214 of the station 106e is normally off, to save power. A smartphone, configured as a station 106, comes in to the building and wants to interact with the sensor station 106e, e.g., to discover its location or issue a command. The smartphone station 106 issues a low power wake up signal. A neighboring sensor stations 106e may be configured to detect the low power wake-up signal using the wake-up circuit 230 and activate or turn on the transceiver 214 (radio). Either the sensor station 106e proactively sends a packet indicating the location, or the sensor station 106e waits for reception of a packet from the smartphone station 106 to determine which action to take.

The wake-up circuit 230 may be configured to operate according to several modes. For example, in a first mode the low power receiver 228 is always on and waiting to receive a wake up packet. This may ensure fastest response but results in higher power consumption. In another mode, the low power receiver 228 is not always on and may operate according to a wake-up duty cycle. The wake up duty cycle may be adapted to tolerable interaction delay. In some cases, the wake up signal may therefore be sent multiple times to find the low power receiver 228 in the on state.

In other implementations a low power receiver station 106e may be associated with an access point 104. As such, in one aspect, the low power receiver station 106e interaction is with the access point 104 and can exploit cooperation with the access point 104 (e.g., synchronous operation is possible). For example, when associated there may be ways to enhance existing power save modes. For example, in a power save mode, a low power receiver station 106e may wake up to receive beacons. The beacon indicates if the low power receiver station 106e needs to stay awake further to receive downlink data (e.g., paged). In addition, there may be enhancement with low power wakeup receiver 228 where the access point 104 sends a low power wake-up signal before the beacon, indicating whether the low power receiver station 106e is (or may) be paged in the beacon. If the low power receiver station 106e is for sure not paged, the low power receiver station 160e need not turn on the transceiver 214 to receive the beacon to save power. In these cases, the low power receiver 228 may need to be on at least some time before the beacon, to receive the wake-up signal.

In addition, by using association there may be benefits based on traffic assumptions. For example as there may be a low probability of downlink data (in this case the low power receiver station 106e may go to sleep most of the times after the low power wake-up signal. In addition, there may be benefits in the case of long sleep time and large clock drift where the low power wake-up signal indicates when a beacon is coming. The low power receiver station 106e need not turn on the transceiver 214 until that time.

The RF low power wake-up signal may be transmitted on the same channel as other data signals. For example, the low power wake-up signal may be transmitted on the same channel as Wi-Fi data signals. As such, coexistence with the other data is provided. More particularly, coexistence with Wi-Fi signals may be provided. In one aspect, various considerations may be taken into account for providing coexistence. For example, a wake-up signal may have narrower bandwidth than a Wi-Fi signal. In addition, there may be regulatory limitations on how narrowband the wakeup signal can be which may imply a limit on the sensitivity/range. The low power receiver stations 106e may be power constrained and likely using low transmit power themselves. As such, for stations 106e in an associated state (e.g., likely to be close to the access point 104), the downlink link budget may be several dB better than the uplink one. Furthermore, it may be acceptable that the sensitivity of low wake up receiver 228 is up to ~20 dB worse than the regular receiver. For non-associated stations, for proximity application (e.g., location tags, non-associated scenario) the applications may require less sensitivity, because the range may be less important.

Figure 5A:
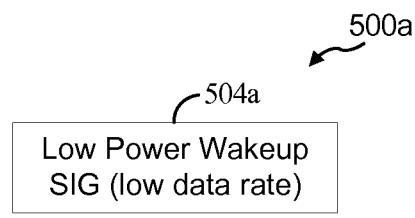
FIG. 5A shows an exemplary low power wake up signal.

FIG. 5A shows a structure of an exemplary low power wake-up signal 500a, in accordance with an implementation. For example, the wake-up signal 500a may be a single-phase signal 504a that carries an encoded signal. The wake-up signal may be transmitted using on-off keying, frequency-shift keying, or the like. For example, if using something similar to on-off keying, the wake-up signal 500a may be a sequence represented as zeros and ones. When the wake-up circuit 230 and low power receiver 228 detect a particular sequence of zeros and ones, the wake-up circuit 230 may trigger turning on the receiver 212. The wake-up circuit 230 may have multiple correlators to try to detect each possible signal.

Figure 5B:
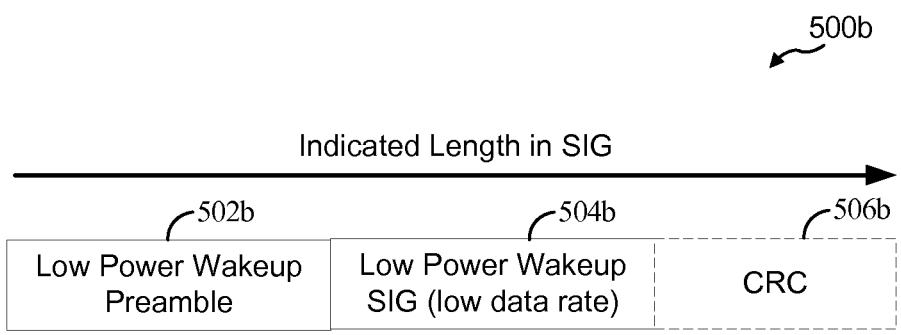
FIG. 5B shows another exemplary low power wake up signal.

FIG. 5B shows a structure of another exemplary low power wake-up signal 500b, in accordance with an implementation of the invention. The low power wake-up signal includes two portions. This first portion 502b includes a 'global' sequence (robust), i.e. like a 'low power wake up preamble.' This may allow the low power receiver 228 to detect that a low power signal 500b is coming up. The second portion 504b, following the first portion 502a, includes encoded information. The encoded information may indicate the identifier of the station 106e to be woken up or other information. Optionally, there may be a third portion 506b including a checksum for error detection. The first portion 502b may be formed using an on-off keying, frequency-shift keying, or other modulated preamble sequence that may provide the timing and detection. In some implementations, the second portion 504b may include data that may be spread/encoded. Spreading/encoding may be agreed by transmitting and receiving stations.

In addition, the low power wake-up signal may be provided in a sequence of transmissions that provide for coexistence. For example, an additional 'Wakeup PPDU format' preamble may be provided, such as an new wake-up PPDU format for a 802.11 OFDM PHY preamble followed by the new low power wake-up signal. The OFDM PHY preamble may indicate a duration (in SIG field) that makes 802.11 stations defer for the duration of the signal and the wake-up time for the receiver 212. The 802.11 stations may assume there is a regular packet coming up. As such, reception of the payload may fail, but the 802.11 station defers for the time indicated in PHY preamble. Furthermore, the low power wake-up signal may be provided to have up to approximately 20 ms signaling duration to match the duration of a typical PPDU. In addition, Null Packets (QoS Null frames to the station) may be sent during the wake-up time (e.g., period of time the transceiver 214 of the low power receiver station 106e needs to be turned on) to make sure other devices honor contention based mechanisms for accessing the channel. In addition, there may be multiple wake-up signals protected by a same PHY preamble. In addition, the PHY preamble may have a bandwidth that narrower than an 802.11 preamble.

Figure 6A:
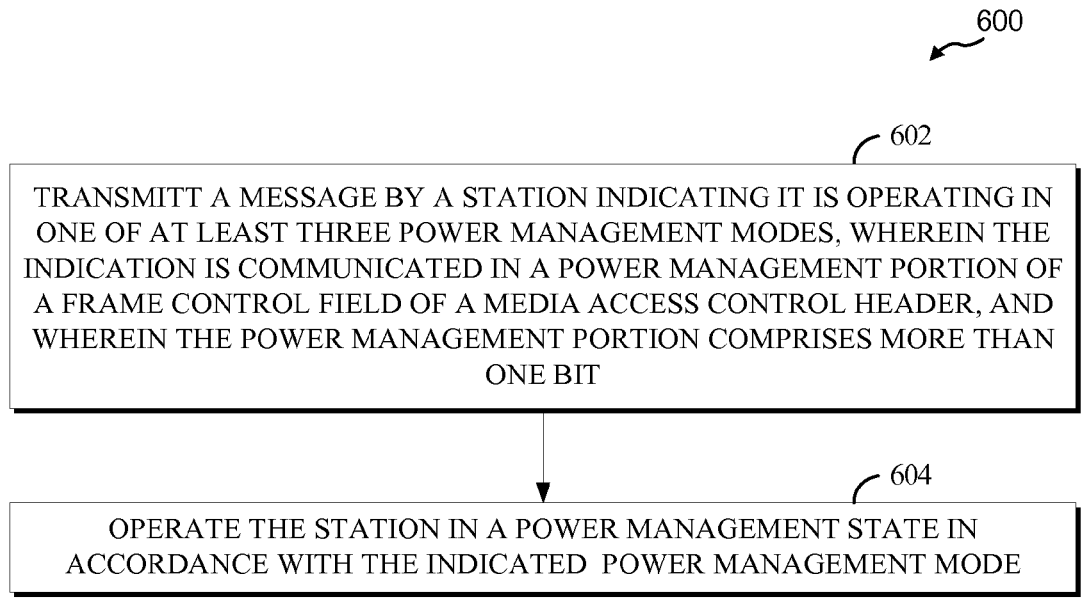
FIG. 6A is a flowchart of an exemplary method 600 of a station operating in one of at least three power management modes.

FIG. 6A is a flowchart of an exemplary method 600 of a station 106 operating in one of at least three power management modes. In some implementations, the three power management modes are active mode, regular 802.11 power save mode, and power save with ultra low power (PS-ULP).

In block 602, a message is transmitted by a station indicating it is operating in one of at least three power management modes. The indication is communicated in a power management portion of a frame control field of a media access control header. The power management portion comprises more than one bit.

In some implementations, a power management portion including two bits may indicate one of three power management modes using binary coding. In some implementations that have four power management modes, two bits may also be used to indicate one of the four power management modes. Other contemplated implementations include a power management portion including more than two bits, for example, if more than four power management modes are implemented and communicated to the network.

When the power management portion is clear (all bits set to zero), it may indicate the station is operating in a first power management mode. The first power management mode may be an active mode 270. When the power management portion includes a low order bit that is set, (e.g. 0x01) it may indicate the station is operating in a second power management mode. This second power management mode may be a normal power save mode 275, as shown in FIG. 2B. When the power management portion includes a high order bit that is set, (e.g. 0x10), it may indicate the station is operating is a third power management mode. This third power management mode may be a power save with low power mode 280, as shown in FIG. 2B.

In some implementations, if the device performing process 600 does not transmit the message in block 602, the lack of a transmitted message indicates the station is operating in the second power management mode.

In block 604, the station is operated in a power management state in accordance with the indicated power management mode. For some implementations, the device performing process 600 supports operation in three operational states, distinct from the communicated power management mode, such as an awake state, a doze state, and a low power state. In other implementations, the device performing process 600 supports operation in two power management states, such as an awake state and a low power state. FIG. 2B shows a device state affecting the power management mode communicated on a wireless network. Therefore, a wireless network may implement a plurality of power management modes that manage how the wireless network interacts with the device based on the communicated power management mode. For example, the wireless network may support different methods of interacting or communicating with the device based on a communicated active mode, a normal power save mode, and a power save with low power mode (for example, power save with ultra low power (PS-ULP). The operational state of the device may map to one or more network power management modes as described above with respect to FIG. 2B. The method 600 may be performed by a station 106, an access point 104, or other communicating device.

In one aspect, operating the station in a power save with ultra low power state may include operating a primary receiver in at least two states. In an awake state, the primary receiver can receive frames. In a doze state, the primary receiver is unable to receive frames, but also consumes less power than when in the active state. The primary receiver may be triggered from the inactive state to the active state by a message received by a secondary receiver. In some aspects, the primary receiver operates in an active state based on a schedule message received from the wireless network. In some aspects, the secondary receiver receives the schedule message. In some aspects, messages received by the secondary receiver are of shorter duration and/or lower energy than messages received by the primary receiver.

In some aspects, the secondary receiver may also operate in at least two states. For example, the secondary receiver may operate in an awake state, where it is configured to receive messages, and in a doze state, where it is unable to receive messages but consumes less power compared to operation in the awake state. In at least some of these aspects, one or more time intervals may be determined when the secondary receiver may receive a message. For example, a message may be received by either the primary or the secondary receiver that indicates the one or more time intervals. In some aspects, the time intervals when the secondary receiver may receive a message correspond to beacon intervals.

In some aspects, operating the station in accordance with a power save power management mode including operating a primary receiver in an awake or a doze state. The receiver is unable to receive frames in the doze state, but consumes less power when compared to the awake state. In the power save power management mode, transitions of the primary receiver between the awake and doze state may be performed based on determined time intervals when an access point is scheduled to transmit one or more messages to a station. These time intervals may be determined based on one or more schedule messages received from the access point. In some aspects, these time intervals correspond to beacon intervals.

In some aspects, operating the station in accordance with an active state includes configuring a primary receiver to continuously receive one or more frames from the wireless network for the duration of the power management state in accordance with the active power management mode. In this state, the primary receiver may not transition to a doze or lower power state. Additionally, in this state, a secondary low power receiver may be in a doze state, where it consumes no or less power than when in an awake state, and is unable to receive low power messages.

Figure 6B:
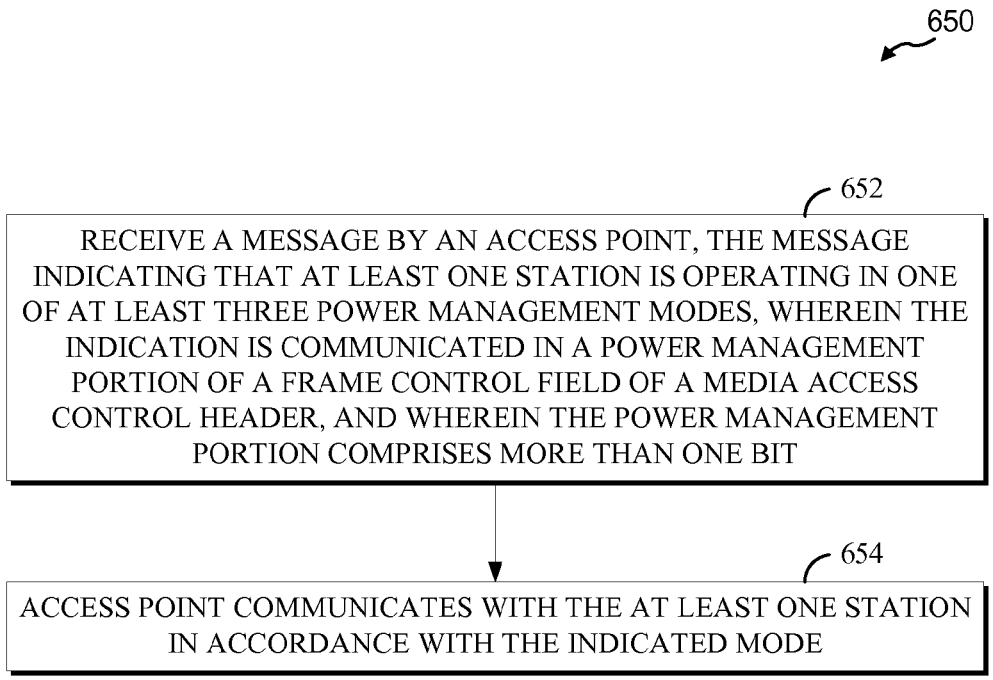
FIG. 6B is a flowchart of an exemplary method 650 of an access point communicating with a station that is operating in one of at least three power management modes.

FIG. 6B is a flowchart of an exemplary method 650 of an access point communicating with a station that is operating in one of at least three power management modes. In some implementations, the three power management modes are active mode, regular 802.11 power save mode, and power save with ultra low power (PS-ULP) mode. For some implementations, in block 652, an access point receives a message indicating that at least one station is operating in one of at least three power management modes. The indication is communicated in a power management portion of a frame control field of a media access control header. The power management portion comprises more than one bit.

For example, in some aspects, the power management portion may comprise two bits, so that up to four power management modes may be indicated in some embodiments through binary encoding of the power management mode. In some aspects, the power management portion may comprise three bits, with some embodiments encoding up to eight power management modes using the three bits.

In block 654, the access point 104 communicates with the at least one station 106 in accordance with the indicated power management mode. Method 654 may be performed by a station 106, an access point 104, or other communicating device.

In some implementations, the device performing process 650 communicates with a second device or station operating in one of three operational states, such as an awake state, doze state, and a low power state. These three operational states may map to one or more wireless communication power management modes as illustrated in FIG. 2B. The wireless network may support an active power management mode, a normal power management power save mode, and a power save with low power power management mode. In another implementation, the second device supports operation in two power management states. This implementation may support an awake power management state and a low power power management state.

In some aspects, communicating with the station in accordance with a power save with low power power management mode may include transmitting one or more lower power and/or short duration paging messages in response to receiving data to be downlinked to the station. The lower power and/or short duration messages may indicate a time interval when the data will be downlinked. The paging messages may be configured to be received by a low power receiver in the station. In some aspects, the time interval may be determined based on an estimated time required for the receiving station to wake up its primary receiver. In response to receiving a low power and/or short duration message, the station may transition its primary receiver from a doze state to an awake state, such that it can receive the downlinked data during the time interval.

Figure 7A:
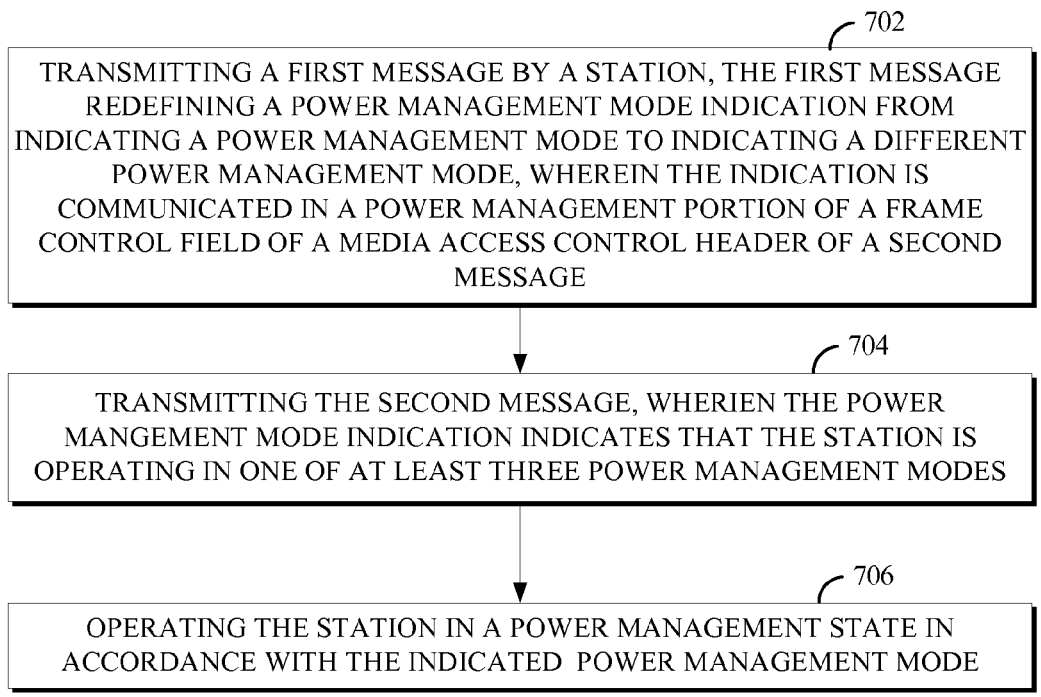
FIG. 7A is a flowchart of an exemplary method 700 of a station operating in one of at least three power management modes.

FIG. 7A is a flowchart of an exemplary method 700 of a station 106 operating in one of at least three power management modes. In some implementations, the three power management modes are active mode, regular 802.11 power save mode, and power save with ultra low power (PS-ULP).

In block 702, a first message is transmitted by a station. The first message redefines a power management mode indication from indicating a power management mode to indicating a different power management mode, wherein the indication is communicated in a power management portion of a frame control field of a media access control header of a second message.

In some aspects, the power management indication in the second message is one bit in length. In some aspects, when the bit is clear, a first power management mode is indicated. When the bit is set in some aspects, a second power management mode is indicated. In one aspect, the first message may redefine the meaning of the bit being set, such that when the bit is set, a third power management mode is indicated. In another aspect, the first message may redefine the meaning of the bit being clear, such that when the bit is clear, a third power management mode is indicated.

In block 704, the second message is transmitted. The power management mode indication indicates that the station is operating in one of at least three power management modes. As discussed above, in one aspect, the power management indication is one bit in length. In one aspect of block 704, the bit may be clear, indicating a first power management mode. In this aspect, the bit may also be set, indicating a third power management mode. In another aspect, a clear bit may indicate the third power management mode.

In block 706, the station is operated in accordance with the indicated power management mode. For some implementations, the device performing process 700 supports operation in three operational states, distinct from the communicated power management mode, such as an awake state, a doze state, and a low power state. In other implementations, the device performing process 700 supports operation in two power management states, such as an awake state and a low power state. FIG. 2B shows a device state affecting the power management mode communicated on a wireless network. Therefore, a wireless network may implement a plurality of power management modes that manage how the wireless network interacts with the device based on the communicated power management mode. For example, the wireless network may support different methods of interacting or communicating with the device based on a communicated active mode, a normal power save mode, and a power save with low power mode (for example, power save with ultra low power (PS-ULP). The operational state of the device may map to one or more network power management modes as described above with respect to FIG. 2B. Block 706 may be performed in accordance with one or more of the functions described above with respect to block 604 of FIG. 6A.

Some aspects of process 700 may further include transmitting a third message, the third message resetting the power management mode indication to a default meaning. For example, if a default value for a power management mode indicator is to indicate a first power management mode when the bit is clear and a second power management mode when the bit is set, the message transmitted in block 702 may define the power management mode indicator such that when the bit is set, a third power management mode is indicated. Transmission of the third message may reset the meaning of a set power management mode indicator such that it again indicates the second power management mode. Alternatively, in aspects where the first message of block 702 defines the meaning of a clear power management bit, the third message may reset the meaning of a clear power management bit to indicate the first power management mode.

In some aspects, communicating with the station in accordance with a power save with low power power management mode may include transmitting one or more lower power and/or short duration paging messages in response to receiving data to be downlinked to the station. The lower power and/or short duration messages may indicate a time interval when the data will be downlinked. The paging messages may be configured to be received by a low power receiver in the station. In some aspects, the time interval may be determined based on an estimated time required for the receiving station to wake up its primary receiver. In response to receiving a low power and/or short duration message, the station may transition its primary receiver from a doze state to an awake state, such that it can receive the downlinked data during the time interval.

Figure 7B:
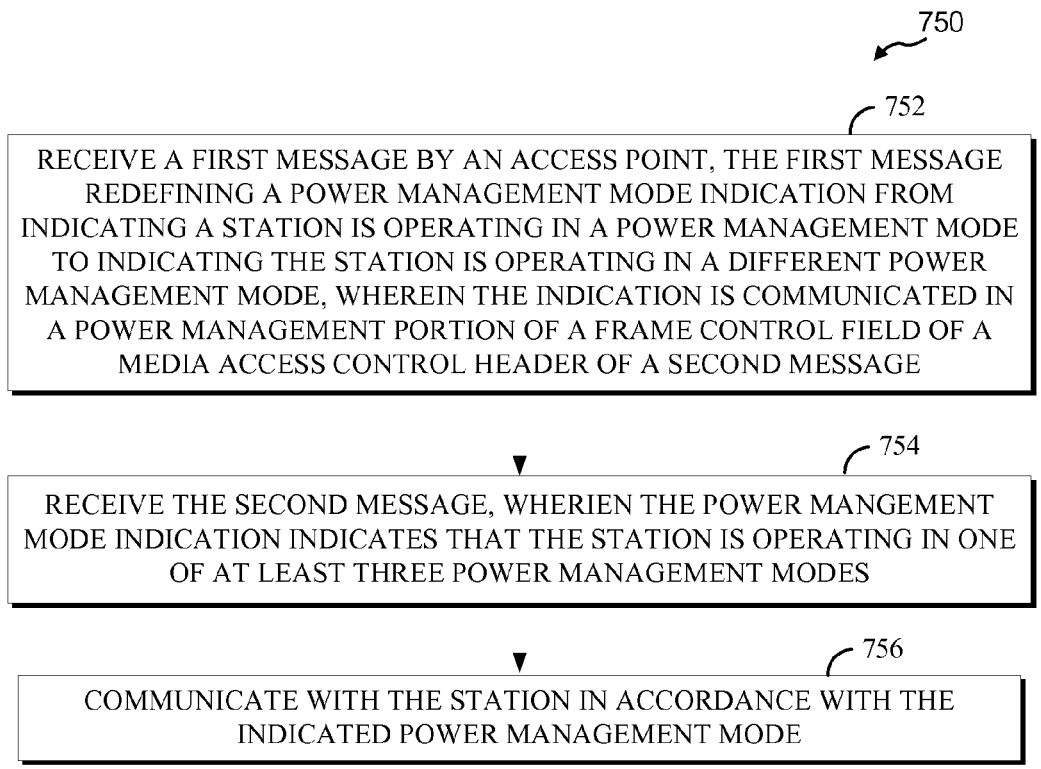
FIG. 7B is a flowchart of an exemplary method 750 of an access point communicating with a station that is operating in one of at least three power management modes.

FIG. 7B is a flowchart of an exemplary method 750 of an access point communicating with a station that is operating in one of at least three power management modes. In some implementations, the three power management modes are active mode, regular 802.11 power save mode, and power save with ultra low power (PS-ULP). For some implementations, in block 752, an access point receives a message redefining a power management mode indication from indicating a station is operating in a power management mode to indicating the station is operating in a different power management mode. The indication is communicated in a power management portion of a frame control field of a media access control header of a second message.

In some aspects, the power management indication in the second message is one bit in length. In some aspects, when the bit is clear, a first power management mode is indicated. When the bit is set in some aspects, a second power management mode is indicated. In one aspect, the first message may redefine the meaning of the bit being set, such that when the bit is set, a third power management mode is indicated. In another aspect, the first message may redefine the meaning of the bit being clear, such that when the bit is clear, a third power management mode is indicated.

In block 754, the second message is received. The power management mode indication indicates that the station is operating in one of at least three power management modes. As discussed above, in one aspect, the power management indication is one bit in length. In one aspect of block 754, the bit may be clear, indicating a first power management mode. In this aspect, the bit may also be set, indicating a third power management mode. In another aspect, a clear bit may indicate the third power management mode.

In block 756, the access point 104 communicates with the at least one station 106 in accordance with the indicated power management mode. Method 750 may be performed by a station 106, an access point 104, or other communicating device.

In some implementations, the device performing process 750 communicates with a second device or station operating in one of three operational states, such as an awake state, doze state, and a low power state. These three operational states may map to one or more wireless communication power management modes as illustrated in FIG. 2B. The wireless network may support an active power management mode, a normal power management power save mode, and a power save with low power power management mode. In another implementation, the second device supports operation in two power management states. This implementation may support an awake power management state and a low power power management state.

Some aspects of process 750 may further include receiving a third message, the third message resetting the power management mode indication to a default meaning. For example, if a default meaning for a power management mode indicator is to indicate a first power management mode when the bit is clear and a second power management mode when the bit is set, the message received in block 752 may define the power management mode indicator such that when the bit is set, a third power management mode is indicated. Reception of the third message may reset the meaning of a set power management mode indicator such that it again indicates the second power management mode. Alternatively, in aspects where the first message of block 752 defines the meaning of a clear power management bit, the third message may reset the meaning of the clear power management bit to indicate the first power management mode.

Figure 8:
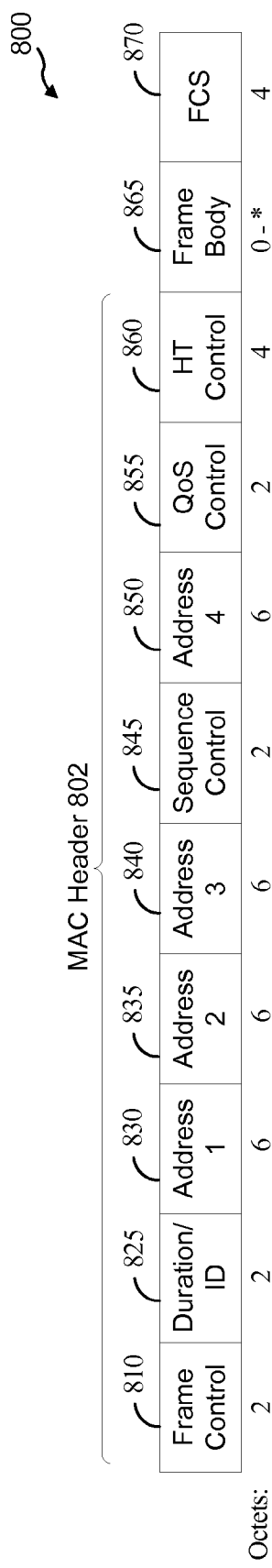
FIG. 8 shows an exemplary structure of a media access control (MAC) frame 800.
Figure 9:
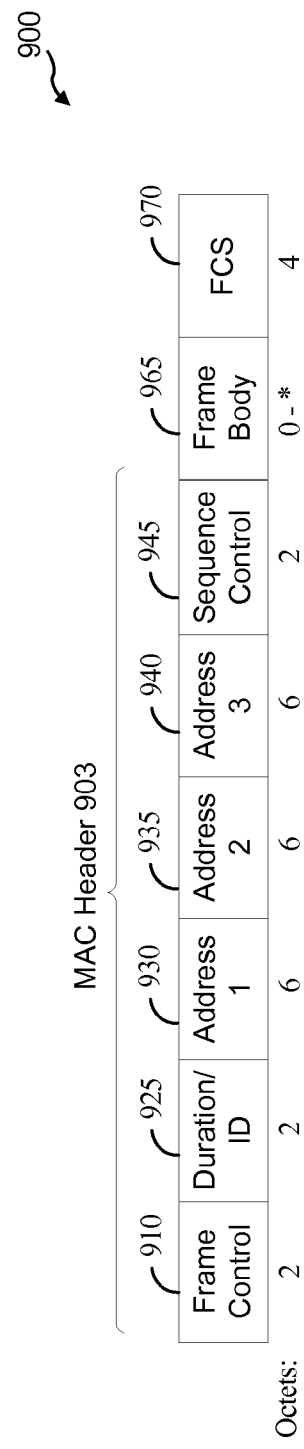
FIG. 9 shows an exemplary structure of a media access control (MAC) frame 900.

FIG. 8 shows an exemplary structure of a media access control (MAC) frame 800. As shown, the MAC frame 800 includes 11 different fields: a frame control (fc) field 810, a duration/identification (dur) field 825, a receiver address (a1) field 830, a transmitter address (a2) field 835, a destination address (a3) field 840, a sequence control (sc) field 845, a fourth address (a4) field 850, a quality of service (QoS) control (qc) field 855, a High Throughput (HT) control field 860, the frame body 865, and a frame check sequence (FCS) field 870. The fields 810-860 make up the MAC header 802. Each field may be comprised of one or more sub-fields or fields. For example, frame control field 810 of media access control header 802 may be comprised of multiple subfields, such as a protocol version, type field, subtype field, and other fields discussed below with respect to FIG. 10. FIG. 9 shows another implementation of a MAC header 903. MAC header 903 differs from MAC header 802 in that it does not include the QOS Control field 855 and HT Control field 860.

FIG. 10 shows an exemplary structure of a frame control field 810 and 910 of the MAC headers 802 and 903 shown in FIGS. 8 and 9 respectively. As shown, the frame control field includes a protocol version field 1011, a type field 1012, a subtype field 1013, a To DS field 1014, a from DS field 1015, a more fragments field 616, a retry field 1017, a power management field 1018, a more data field 1019, a protected frame field 1020, and an order field 1021. The type of the MAC frame 900 may be defined by the combination of type and subtype fields 1012 and 1013. For example, for a management frame, the type field 1012 may have a binary value of 00. The subtype field 1013 may then indicate the type of management field with a four bit value providing 16 different management field types. As another example, the type of MAC frame 900 may be a control frame indicated by a type field 1012 with a binary value of 01. The subtype field 1013 may further indicate different types of control fields such as block ack request frames, block ack frames, ps-poll frames, request to send (RTS) fields, clear to send (CTS) fields, and the like.

In some cases it may be advantageous to define new types and formats of MAC frames for different uses/purposes. For example, it may be advantageous to define a new management frame type to provide for enhanced power management capabilities. For example a new management frame subtype may indicate a management frame defining how a power management indication of a wireless message should be interpreted by a receiving device. In an implementation, the new management frame may define whether the indication of a second power management mode indicates the second or a third power management mode. For example, in an implementation, the new management frame may include data defining how the indication should be interpreted. In an implementation, the data may be included in an extended capabilities element. Alternatively, two new management frames may be defined. In this implementation, a first new management frame defines the power management indication to indicate a second power management mode, while a second new management frame defines the power management indication to indicate a third power management mode.

Figure 11A:
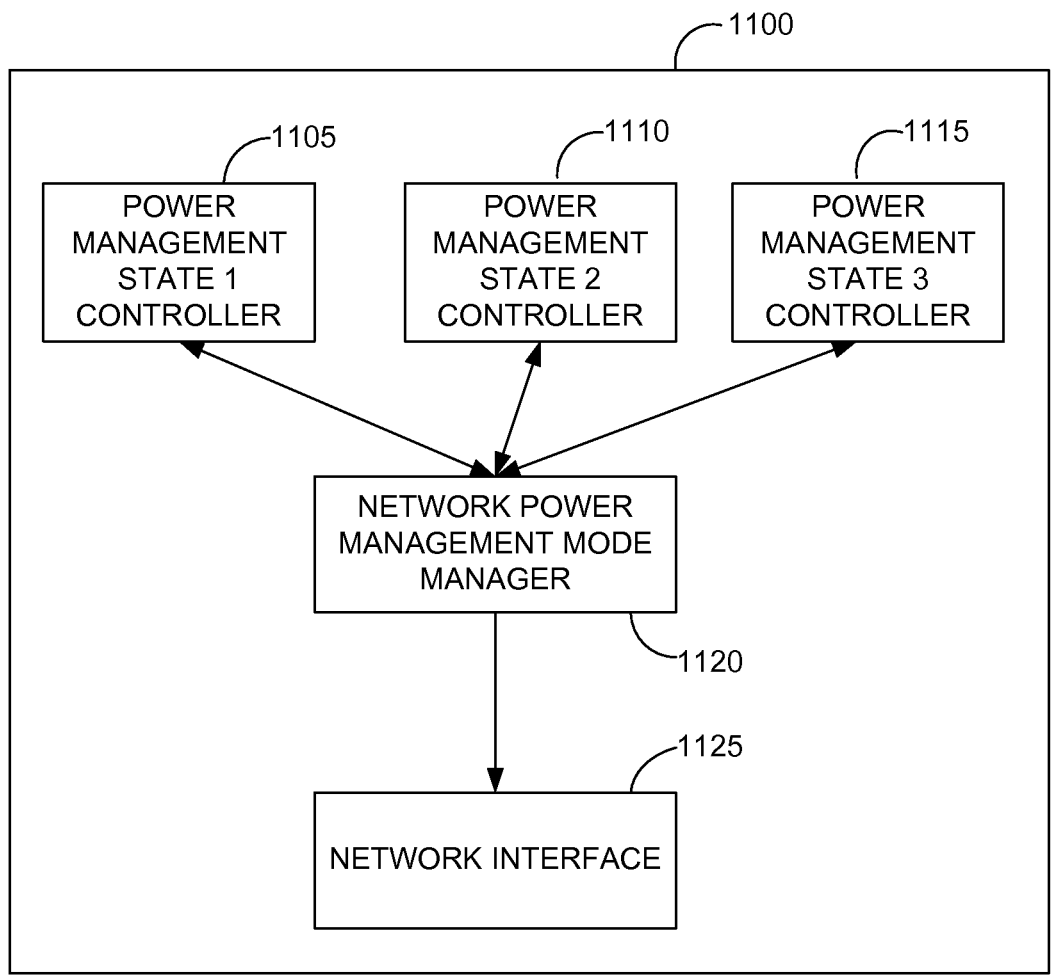
FIG. 11A is a functional block diagram of an exemplary wireless device 1100 that may be employed within the wireless communication system 100.

FIG. 11A is a functional block diagram of another exemplary wireless device 1100 that may be employed within the wireless communication system 100. In one aspect, device 1100 may include one or more components as discussed above with respect to wireless device 202 of FIG. 2. In some aspects, the components of apparatus 1100 discussed below may be configured to perform process 600 and/or 700 discussed above. Those skilled in the art will appreciate that a wireless communication device 1100 may have more components than the wireless communication devices shown in FIGS. 2-4. The wireless communication device 1100 shown includes only those components useful for describing some prominent features of certain implementations. The device 1100 includes a power management state 1 controller 1105, a power management state 2 controller 1110, and a power management state 3 controller 1115. Device 1100 also includes a network power management mode manager 1120 and a network interface 1125. These components of device 1100 may include processor instructions that configure a processor (not shown) to perform one or more functions of device 1100.

In an implementation, each of the power management state 1 controller, the power management state 2 controller, and the power management state 3 controller include instructions that configure a processor, such as processor 204 of FIG. 2, to control the power management functions of device 1100 when it is operating in each of the three states. In some case, each of the controllers 1105, 1110, and 1115 may be a means for operating in a particular power management state. For example, any of controllers 1105, 1110, and 1115 may be configured to perform the functions of blocks 604 or 706, discussed above.

The network power management mode manager 1120 includes instructions that configure a processor to set a network power management mode based, at least in part, on a power management state of the device 1100. In an implementation, as device 1100 transitions between a first, second, and possibly third power management state, and the network power management mode manager 1120 may set a network power management mode to be consistent with the power management state of device 1100. For example, FIG. 2B shows how wireless device 202 states and network power management modes may be consistent.

In one implementation, when an application running on device 1100 (not shown) is actively communicating on a wireless network via network interface 1125, the device 1100 may operate in an awake power management state. When in this state, the network power management mode manager 1120 may set a network mode to also be active, to support the communication needs of the application. When there is no active application running on device 1100, the station may communicate less frequently over the wireless network. For example, in this state, the wireless communication performed by the station may be characterized as periodic status messages between the station and an access point. In this state, the station may enter a power saving state. For example, the device 1100 may enter a doze state 260 or a low power state 265, as illustrated in FIG. 2B. In response, the network power management mode manager may set a network power management mode to a normal power save mode 275 or a power save with low power mode 280.

The power management mode manager may maintain the state of a power management indication included in one or more network messages. In an implementation, the power management mode manager 1120 may be configured to perform the functions of any of blocks 602, 604, 702, 704, or 706 discussed above. In one implementation, the power management mode manager may be a means for transmitting a message on the wireless network.

The network interface 1125 includes instructions that configure a processor to perform the networking functions of device 1100. For example, the network interface 1125 may configure a processor (not shown) to transmit messages using a transmitter, such as transmitter 210 of FIG. 2, or receive messages using a receiver, such as receiver 212 of FIG. 2, on a wireless network (not shown).

Figure 11B:
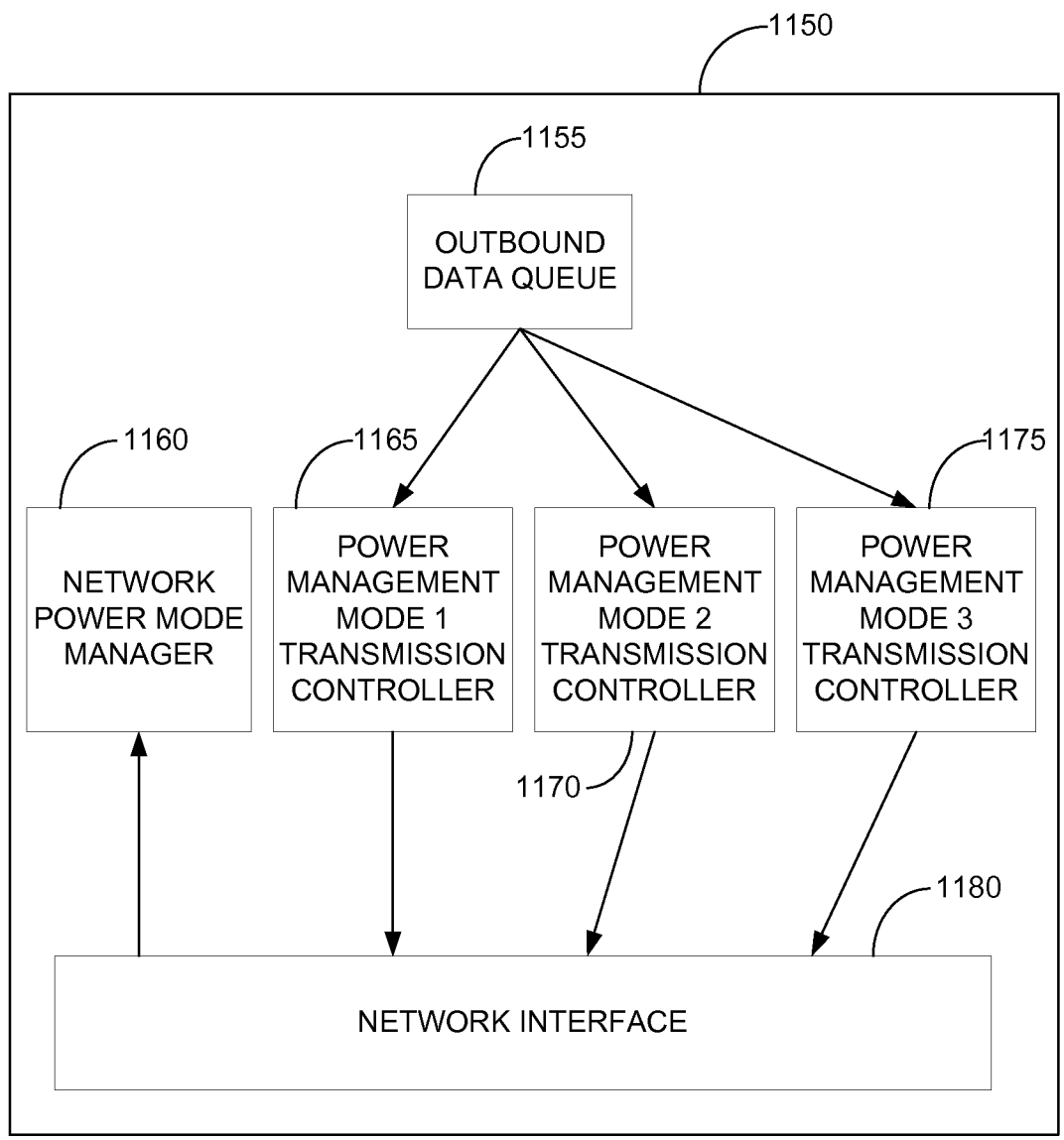
FIG. 11B is a functional block diagram of an exemplary wireless device 1100 that may be employed within the wireless communication system 100.

FIG. 11B is a functional block diagram of another exemplary wireless device 1150 that may be employed within the wireless communication system 100. In some aspects, the apparatus 1150 may be configured to perform process 650 and/or 750 as discussed above. In one aspect, device 1100 may include one or more components as discussed above with respect to wireless device 202 of FIG. 2. Those skilled in the art will appreciate that a wireless communication device 1150 may have more components than the wireless communication devices shown in FIGS. 2-4. The wireless communication device 1150 shown includes only those components useful for describing some prominent features of certain implementations.

The device 1150 includes an outbound data queue 1155, network power mode manager 1160, power management mode 1 transmission controller 1165, power management mode 2 transmission controller 1170, and a power management mode 3 transmission controller. 1175. Device 1150 also includes a network interface 1180. Network interface 1180 may be configured to perform one or more of the functions described above with respect to blocks 652 and/or 752-754. The network interface 1180 may include a receiver, such as receiver 212 of FIG. 2, and/or a transmitter, such as transmitter 210 of FIG. 2. Each of components 1160-1180 store instructions that configure a processor, such as processor 204 of FIG. 2, (but not shown) to perform one or more functions of device 1150. For example, the network power mode manager 1160 includes instructions that configure a processor to receive one or more power management mode updates from a wireless network over network interface 1180. As such, instructions in the network power mode manager 1160 may configure a receiver in network interface 1180 to perform one or more of the functions discussed above with respect to blocks 652 and/or 752-754. Instructions in the network power mode manager 1160 may also be configured to perform one or more functions described above with respect to block 654 of FIG. 6B or block 756 of FIG. 7B. Depending on the network power management mode of communication with a station indicated by the received messages, the network power mode manager 1160 may assign control of outbound transmissions of device 1150 to the station to one of the transmission controllers 1165-1175. Instructions in the transmission controllers 1165-1175 may configure a transmitter in network interface 1180 (not shown), such as transmitter 210 of FIG. 2

In an implementation, the power management mode 1 transmission controller 1165 may be responsible for managing outbound transmissions to a station when wireless communication with the station is operating in an active mode. When the wireless communication with the station is in an active mode, device 1150 may transmit data from outbound data queue 1150 to the station. In an implementation, the power management mode 2 transmission controller may manage outbound transmissions to a station when communication with the station is operating in a normal power save mode, such as normal power save mode 275 illustrated in FIG. 2B. Therefore, controller 1170 may transmit paging messages to the station. The controller 1175 may control outbound data transmissions to the station when wireless communication with the station is operating in a power save with low power mode as described above. Therefore, controller 1175 may transmit a wake-up signal to the station based on contents of the outbound data queue 1155. Each of controllers 1165, 1170, and 1175 may be configured to perform one or more functions of blocks 654 or 756 discussed above.

Figure 12:
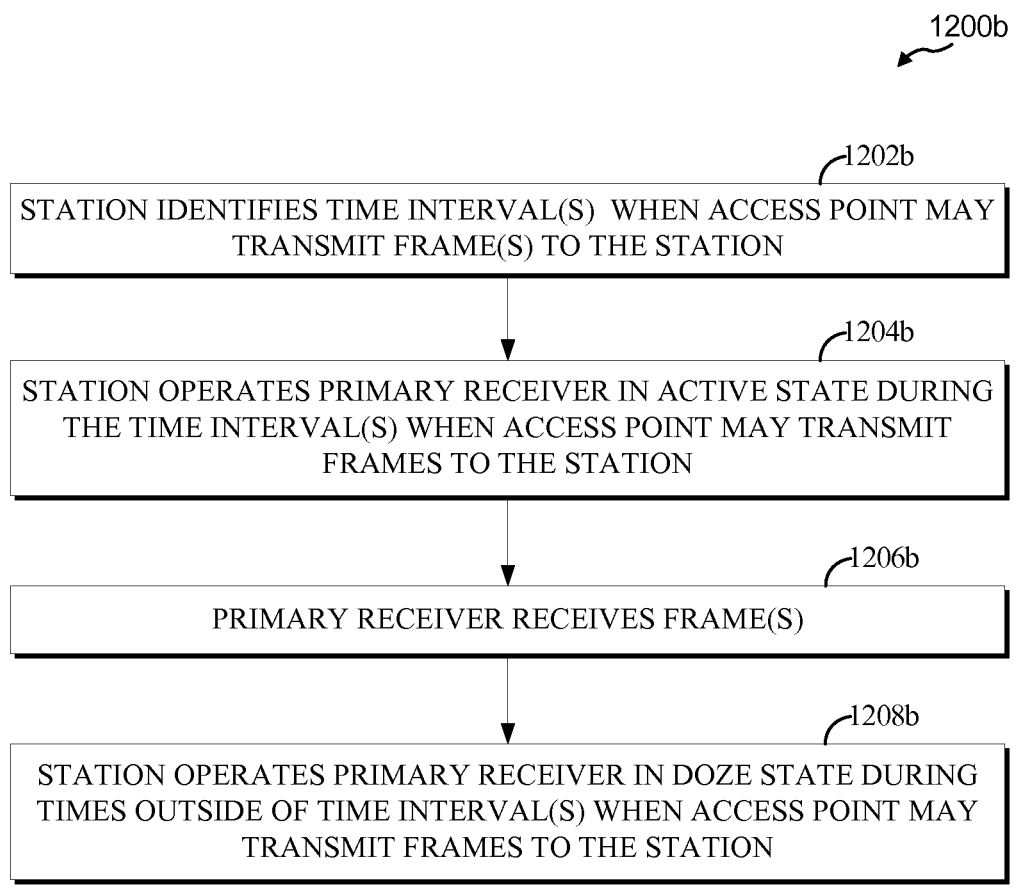
FIG. 12 is a flowchart of an implementation of a station operating in regular PS mode.

FIG. 12 is a flowchart of an implementation of a station operating in a regular 802.11 Power Saving (PS) power management mode. In block 1202b, the station 106 identifies at least one time interval when an access point 104 may transmit at least one frame to the station. In some implementations, the at least one time intervals correspond to beacon intervals. In block 1204b, the station operates a primary receiver, such as receiver 212 of FIG. 2, in an active state during the at least one time interval when an access point may transmit at least one frame to the station. When in this active state, primary receiver 212 is configured to receive at least one frame. In block 1206b, the primary receiver 212 receives the at least one frames. In block 1208b, the station operates the primary receiver 212 in doze state outside of the at least one time interval when an access point may transmit at least on frame to the station. The primary receiver 212 is configured to consume less power when operating in doze state than when operating in awake state. The station 106 consumes less power waiting to receive packets by transition to doze state in PS mode.

Figure 13A:
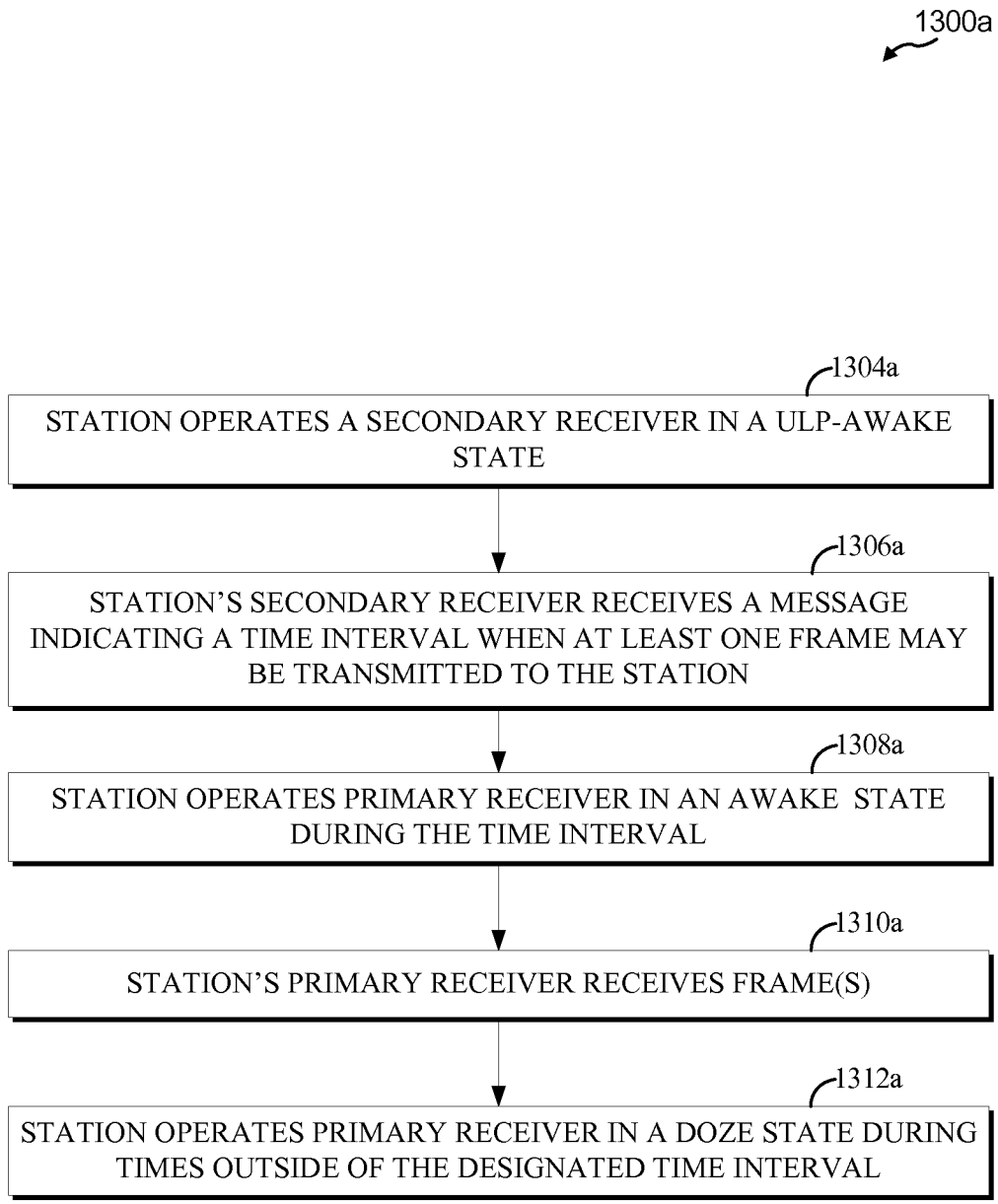
FIG. 13A is a flowchart of an implementation of a station operating in a power save with ultra low power (PS-ULP) power management mode, with a low power receiver operating in ULP-awake state only.

FIG. 13A is a flowchart of a process 1300a, which may be employed by one implementation of a station operating in a power save with ultra low power (PS-ULP) power management mode, with a low power receiver 228 operating in ULP-awake state only. In some aspects, process 1300a may be performed as part of block 604 of FIG. 6A or block 706 of FIG. 7A. In block 1304a, the station operates a low power receiver 228 in a "ULP-awake" state (herein referred to as an ultra low power or ULP-awake state to differentiate it from the awake state of the primary receiver 212). The low power receiver 228 is configured to receive a message when it operates in ULP-awake state. In block 1306a, low power receiver 228 receives the message indicating a time interval when at least one frame may be transmitted to the station. In block 1308a, station 106 operates the primary receiver 212 in an awake state during the time interval indicated in the message. When in the awake state, primary receiver 212 is configured to receive at least one frame. In block 1310a, the station's primary receiver 212 receives at least one frame. In block 1312a, the station operates the primary receiver 212 in a doze state during times outside of the designated time interval. When in doze state, primary receiver 212 is configured to consume less power than it consumes when operating in the awake state.

Figure 13B:
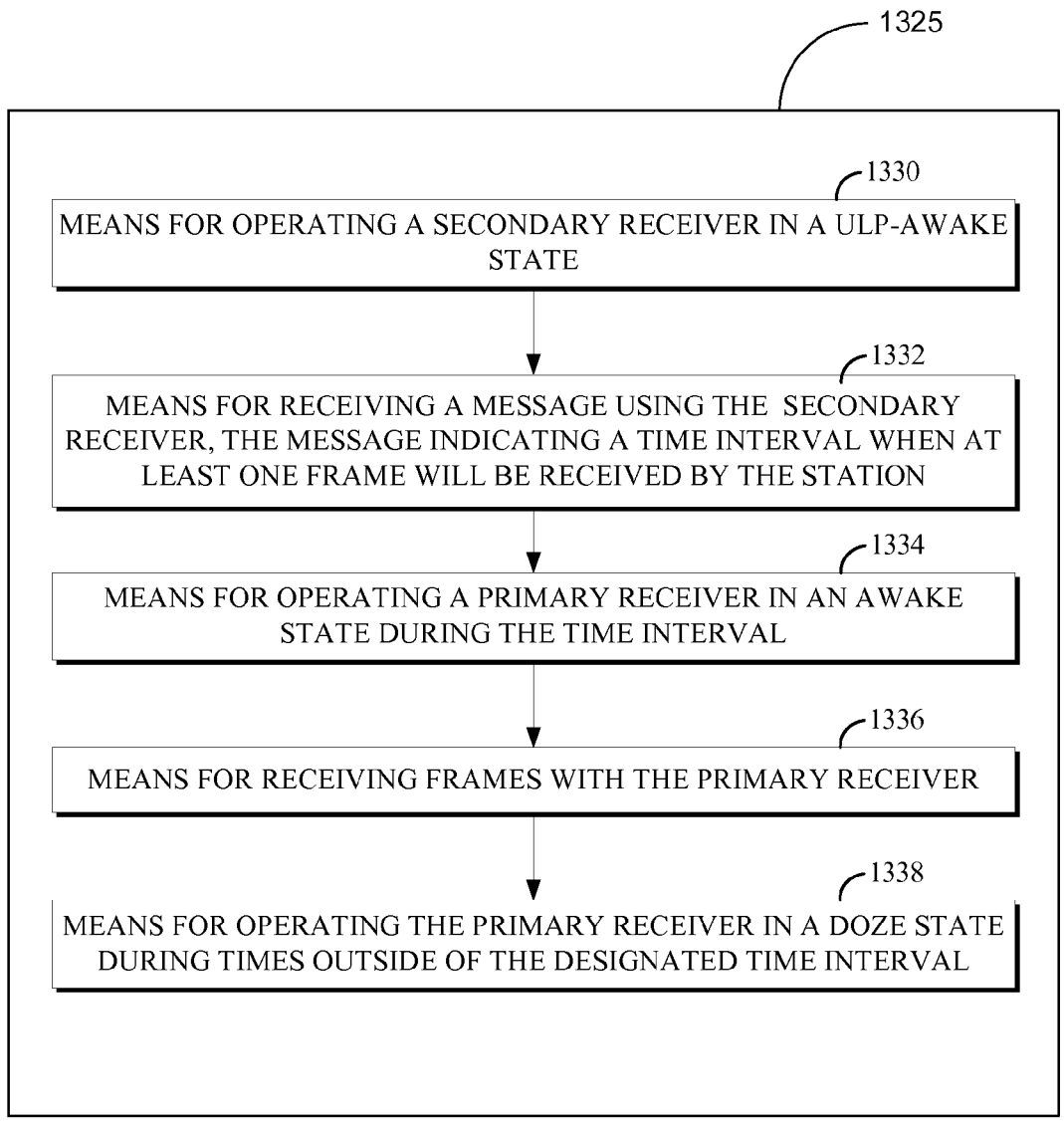
FIG. 13B shows a functional block diagram for a wireless communication apparatus.

FIG. 13B shows a functional block diagram for a wireless communication apparatus 1325. In one aspect, apparatus 1325 may be equivalent to device 1100, discussed with respect to FIG. 11A. In one aspect, apparatus 1325 may be equivalent to wireless device 202, disclosed in FIG. 2A. Those skilled in the art will appreciate that a wireless communication apparatus may have more components than the simplified wireless communication apparatus 1325 shown in FIG. 13B. The wireless communication apparatus 1325 shown includes only those components useful for describing some prominent features of implementations within the scope of the claims.

The wireless communication apparatus 1325 may include a means for operating a secondary receiver in a ULP-AWAKE state 1330. The means for operating 1330 may be configured to perform one or more of the functions discussed above with respect to block 1304a. In one aspect, the means for operating 1330 may include processor 204. The wireless communication apparatus 1325 may further include a means for receiving a message via the secondary receiver, the message indicating an access point will transmit one or more frames to a station at a designated time interval 1332. In one aspect, the means for receiving 1332 may include the receiver 212. In one aspect, the means 1332 may be configured to perform one or more of the functions discussed above with respect to block 1306a. The wireless communication apparatus 1325 may further include a means for operating a primary receiver in an awake state during the designated time interval 1334. The means for operating the primary receiver 1334 may be configured to perform one or more of the functions discussed above with respect to block 1308a. In one aspect, the means for operating 1334 may include processor 204. The wireless communication apparatus 1325 may further include a means for receiving frames with the primary receiver 1336. The means for receiving 1336 may be configured to perform one or more of the functions discussed above with respect to block 1310a. In one aspect, the means for receiving 1336 may include the receiver 212. The wireless communication apparatus 1325 may further include a means for operating the primary receiver in a doze state during times outside of the designated time interval 1338. The means for operating 1338 may be configured to perform one or more of the functions discussed above with respect to block 1312a. In one aspect, the means for operating 1338 may include the processor 204.

Figure 13C:
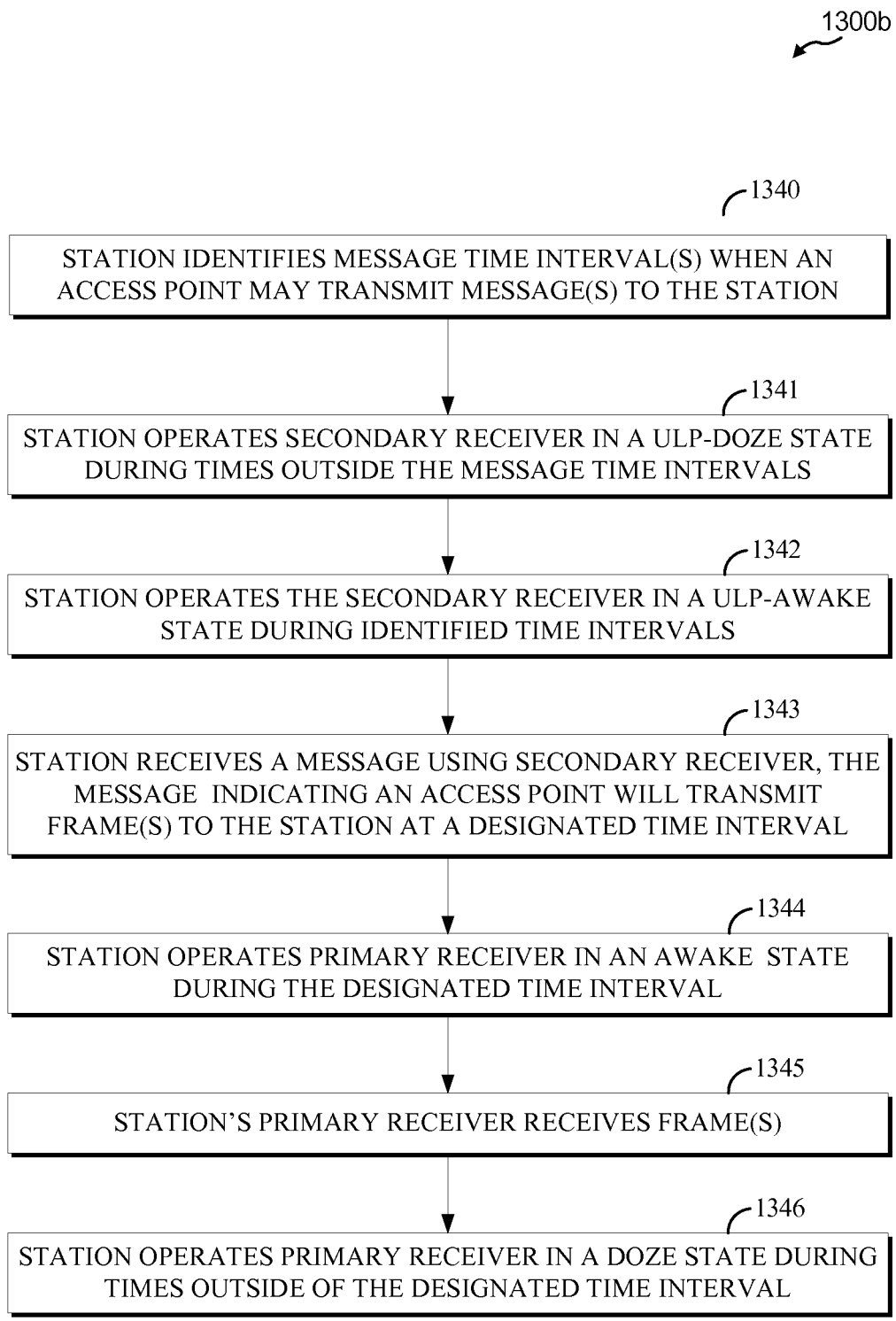
FIG. 13C is a flowchart of an implementation of a station operating in a power save with ultra low power (PS-ULP) power management mode with a low power receiver operating in ULP-awake and ULP-doze states.

FIG. 13C is a flowchart of a process 1300b, which may be employed by one implementation of a station operating in a power save with ultra low power (PS-ULP) power management mode with a low power receiver 228 operating in ULP-awake and ULP-doze states. In some aspects, process 1300b may be performed as part of block 604 of FIG. 6A or block 706 of FIG. 7A. In block 1301b, the station identifies at least one message time interval when an access point may transmit at least on message to the station. In block 1340, a station identifies message time intervals when an access point may transmit messages to the station. The messages may be low power and/or short duration messages configured to be received by a low power receiver of the station. In block 1341, the station operates a secondary receiver in a ULP-DOZE state during times outside the message time intervals. The secondary receiver may be a low power receiver configured to receive the messages referenced in block 1340. In one aspect, the secondary receiver may consume less power when in a ULP-DOZE state, but may be unable to receive messages, for example, it may be unable to receive short duration and/or low power messages from an access point.

In block 1342, the station operates the secondary receiver in a ULP-AWAKE state during the message time intervals identified in block 1340. In block 1342, the station receives a message using the secondary receiver. The message indicates an access point will transmit frame(s) to the station at a designated time interval. In block 1344, the station operates a primary receiver in an awake state during the designated time interval. In block 1345, the primary receive receives one or more frames. In block 1346, the station operates the primary receiver in a doze state during times outside of the designated time interval.

Figure 13D:
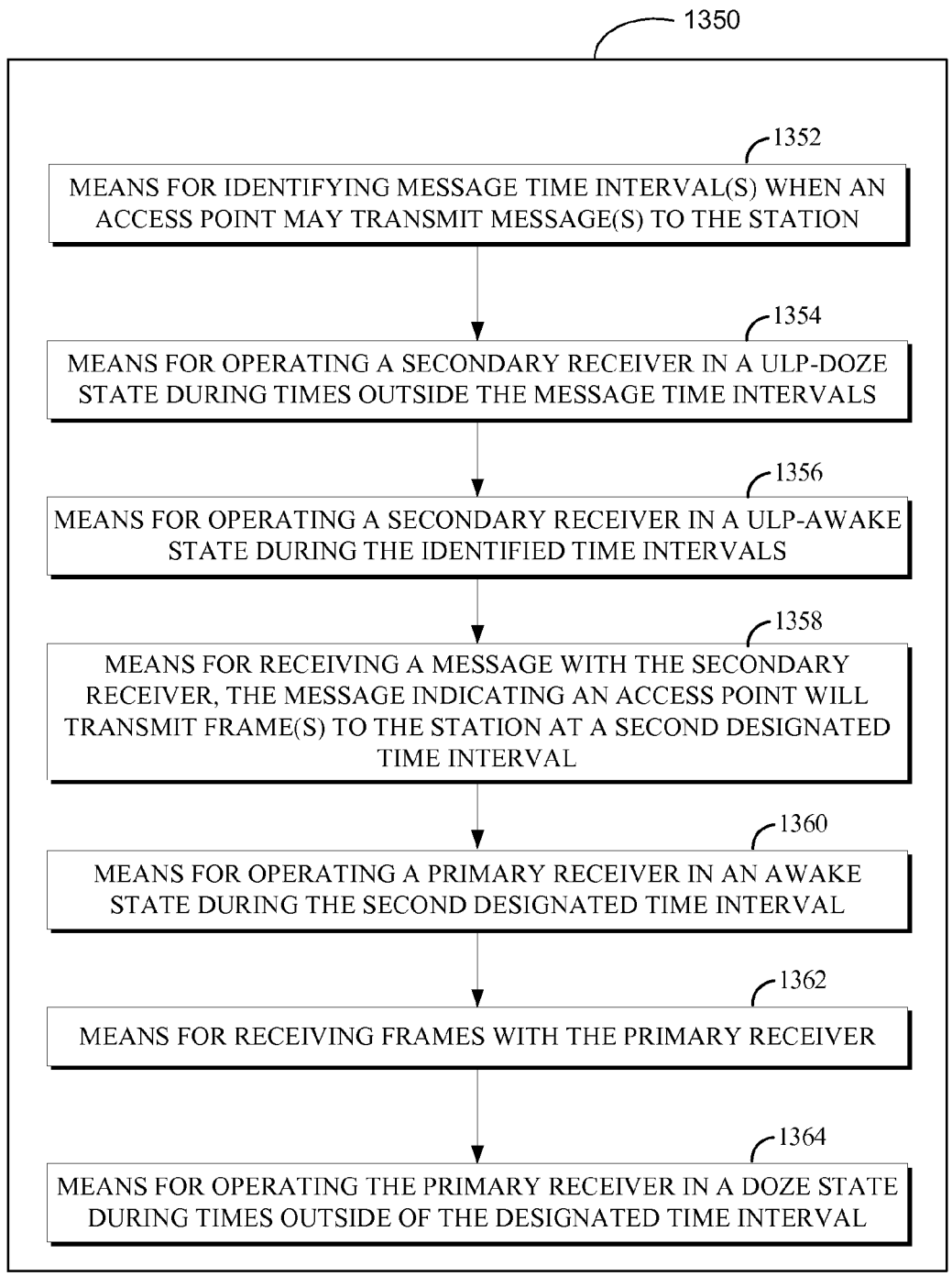
FIG. 13D shows a functional block diagram for a wireless communication apparatus.

FIG. 13D shows a functional block diagram for a wireless communication apparatus 1350. In one aspect, apparatus 1350 may be equivalent to device 1150, discussed with respect to FIG. 11B. In one aspect, apparatus 1350 may be equivalent to wireless device 202, disclosed in FIG. 2A. Those skilled in the art will appreciate that a wireless communication apparatus may have more components than the simplified wireless communication apparatus 1350 shown in FIG. 13D. The wireless communication apparatus 1350 shown includes only those components useful for describing some prominent features of implementations within the scope of the claims.

The wireless communication apparatus 1350 may include a means for identifying message time intervals when an access point may transmit second messages to a station 1352. The means for identifying 1352 may be configured to perform one or more of the functions discussed above with respect to block 1340. In one aspect, the means for identifying 1352 may include the processor 204. The apparatus 1350 may also include a means for operating a secondary receiver in a ULP-DOZE state during times outside the message time intervals 1354. The means 1354 may be configured to perform one or more of the functions discussed above with respect to block 1341. In one aspect, the means for operating 1354 may include processor 204. The apparatus 1350 may further include a means for operating a secondary receiver in a ULP-AWAKE state during the identified time intervals 1356. The means 1356 may be configured to perform one or more of the functions discussed above with respect to block 1342. In one aspect, the means for operating 1356 may include the processor 204.

The apparatus 1350 may further include means for receiving, via the secondary receiver, a message indicating an access point will transmit frames to the station at a second designated time interval 1358. The means 1358 may be configured to perform one or more of the functions discussed above with respect to block 1343. In one aspect, the means for receiving 1358 may include the receiver 212. The apparatus 1350 may further include means for operating the primary receiver in an AWAKE state during the designated time interval 1360. The means 1360 may be configured to perform one or more of the functions discussed above with respect to block 1344. In one aspect, the means for operating 1360 may include processor 204. The apparatus 1350 may further include means for receiving frame(s) via the primary receiver 1362. The means 1362 may be configured to perform one or more of the functions discussed above with respect to block 1345. In one aspect, the means for receiving 1362 may include the receiver 212. The apparatus 1350 may further include means for operating the primary receiver in a doze state during times outside of the designated time interval 1364. The means 1364 may be configured to perform one or more of the functions discussed above with respect to block 1346. In one aspect, the means for operating 1364 may include the processor 204.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating a power management mode of a station on a wireless network, comprising:
    transmitting by the station a first message on the wireless network, the first message indicating one of at least an active, power save, and ultra-low power power management modes, wherein the indication is communicated in a power management portion of a frame control field of a media access control header, and wherein the power management portion comprises more than one bit;
    operating the station in a power management state in accordance with the indicated power management mode,
    wherein operating the station in accordance with the active power management mode comprises:
        configuring a first receiver to continuously receive one or more frames from the wireless network, and
    wherein operating the station in accordance with the power-save power management mode comprises:
        operating the first receiver in two different receiver states,
        wherein in a first state of the two receiver states, the first receiver is configured to receive at least one frame during a time interval when an access point may transmit at least one frame to the station, and
        in a second state of the two receiver states, the first receiver is configured to not receive frames, wherein the first receiver is configured to consume less power when operating in the second receiver state than when operating in the first receiver state,
    wherein operating the station in accordance with the ultra-low power management mode comprises:
        operating the first receiver in the second receiver state, wherein the station transitions to operate in accordance with the active power management mode in response to a second receiver receiving a message from the wireless network,
        determining one or more time intervals when the second receiver may receive a message,
        configuring the second receiver to not receive messages during times outside the one or more time intervals, and
        wherein the second receiver consumes less power when configured not to receive messages than when configured to receive messages.

2. The method of claim 1, wherein the message received by the second receiver reserves the wireless network for a time period, and wherein the first receiver operates in the first receiver state during the reserved time period.

3. The method of claim 1, wherein the message received by the second receiver is of shorter duration than frames received by the first receiver.

4. The method of claim 1, wherein the message received by the second receiver is of lower energy than any frame received by the first receiver.

5. The method of claim 1, wherein the one or more time intervals correspond to beacon intervals.

6. A method of communicating a power management mode of a station on a wireless network, comprising:
    receiving by an access point a first message, the first message indicating that the station is operating in one of at least an active, power save, and ultra-low power power management modes, wherein the indication is communicated in a power management portion of a frame control field of a media access control header, wherein the power management portion comprises more than one bit; and
    communicating with the station in accordance with the indicated mode, wherein communicating with the station in accordance with the active power management mode comprises transmitting data to the station in response to receiving data to be downlinked to the station,
    wherein communicating with the station in accordance with the power save power management mode comprises transmitting an indication to the station that data is available during a periodic interval in response to receiving data to be downlinked to the station,
    wherein communicating with the station in accordance with the ultra-low power management mode comprises transmitting a wake up signal to the station in response to receiving data to be downlinked to the station.

7. The method of claim 6, wherein the wake up signal is configured to be received by a low power receiver.

8. The method of claim 7, wherein the wake up signal is a short duration paging message.

9. An apparatus for communicating a power management mode of a station on a wireless network, comprising:
    a transmitter configured to transmit a first message on the wireless network, the first message indicating one of at least an active, power save, and ultra-low power power management modes, wherein the indication is communicated in a power management portion of a frame control field of a media access control header, wherein the power management portion comprises more than one bit; and a processor configured to operate the apparatus in a power management state in accordance with the indicated power management mode, wherein operating the apparatus in accordance with the active power management mode comprises:
configuring a first receiver to continuously receive one or more frames from the wireless network, and wherein operating the apparatus in accordance with the power-save power management mode comprises:
operating the first receiver in two different receiver states,
wherein in a first state of the two receiver states, the first receiver is configured to receive at least one frame during a time interval when an access point may transmit at least one frame to the station, and
in a second state of the two receiver states, the first receiver is configured to not receive frames, wherein the first receiver is configured to consume less power when operating in the second receiver state than when operating in the first receiver state, wherein operating the apparatus in accordance with the ultra-low power management mode comprises:
operating the first receiver in the second receiver state, wherein the apparatus transitions to operate in accordance with the active power management mode in response to a second receiver receiving a message from the wireless network,
determining one or more time intervals when the second receiver may receive a message,
configuring the second receiver to not receive messages during times outside the one or more time intervals, and
wherein the second receiver consumes less power when configured not to receive messages than when configured to receive messages.

10. The apparatus of claim 9, wherein the message received by the second receiver reserves the wireless network for a time period, and wherein the processor is configured to operate the first receiver in the first receiver state during the reserved time period.

11. The apparatus of claim 9, wherein the message received by the second receiver is of shorter duration than frames received by the first receiver.

12. The apparatus of claim 9, wherein the message received by the second receiver is of lower energy than any frame received by the first receiver.

13. The apparatus of claim 9, wherein the processor is further configured to operate the apparatus in the power management state in accordance with the first of the at least three power management modes by:
determining one or more time intervals when the second receiver may receive a message, and
configuring the second receiver to not receive messages during times outside the one or more time intervals,
wherein the second receiver consumes less power when configured not to receive messages than when configured to receive messages.

14. The apparatus of claim 13, wherein the one or more time intervals correspond to beacon intervals.

15. The apparatus of claim 13, wherein the time interval is a beacon interval.

16. An apparatus for communicating a power management mode of a station on a wireless network, comprising:
a receiver configured to receive a first message; and
a processor configured to interpret the first message, the first message indicating that the station is operating in one of at least an active, power save, and ultra-low power management modes, wherein the indication is communicated in a power management portion of a frame control field of a media access control header, wherein the power management portion comprises more than one bit, the processor configured to communicate with the station in accordance with the indicated mode, wherein communicating with the station in accordance with the active power management mode comprises transmitting data to the station in response to receiving data to be downlinked to the station,
wherein communicating with the station in accordance with the power save power management mode comprises transmitting an indication to the station that data is available during a periodic interval in response to receiving data to be downlinked to the station,
wherein communicating with the station in accordance with the ultra-low power management mode comprises transmitting a wake up signal to the station in response to receiving data to be downlinked to the station.

17. The apparatus of claim 16, wherein the wake up signal is configured to be received by a low power receiver.

18. The apparatus of claim 17, wherein the wake up signal is a short duration paging message.

19. An apparatus for communicating a power management mode of a station on a wireless network, comprising:
means for transmitting by a station a first message on the wireless network, the first message indicating one of at least an active, power save, and ultra-low power power management modes, wherein the indication is communicated in a power management portion of a frame control field of a media access control header, wherein the power management portion comprises more than one bit; and means for operating the station in a power management state in accordance with the indicated power management mode wherein the means for operating is configured to operate the apparatus in accordance with the active power management mode by:
configuring a first receiver to continuously receive one or more frames from the wireless network, and wherein the means for operating is configured to operate the apparatus in accordance with the power-save power management mode by:
operating the first receiver in two different receiver states,
wherein in a first state of the two receiver states, the first receiver is configured to receive at least one frame during a time interval when an access point may transmit at least one frame to the station, and
in a second state of the two receiver states, the first receiver is configured to not receive frames, wherein the first receiver is configured to consume less power when operating in the second receiver state than when operating in the first receiver state, wherein the means for operating is configured to operate the apparatus in accordance with the ultra-low power management mode by:
operating the first receiver in the second receiver state, wherein the apparatus transitions to operate in accordance with the active power management mode in response to a second receiver receiving a message from the wireless network,
determining one or more time intervals when the second receiver may receive a message,
configuring the second receiver to not receive messages during times outside the one or more time intervals, and
wherein the second receiver consumes less power when configured not to receive messages than when configured to receive messages.

20. The apparatus of claim 19, wherein the message received by the second receiver reserves the wireless network for a time period, and wherein the means for operating the station in a power management state in accordance with the indicated power management mode is further configured to operate the station in accordance with the ultra-low power management mode by operating the first receiver in the second receiver state during the reserved time period.

21. The apparatus of claim 19, wherein the message received by the second receiver is of shorter duration than frames received by the first receiver.

22. The apparatus of claim 19, wherein the message received by the second receiver is of lower energy than any frame received by the first receiver.

23. The apparatus of claim 19, wherein the one or more time intervals correspond to beacon intervals.

24. The apparatus of claim 19, wherein the time interval is a beacon interval.

25. An access point for communicating a power management mode of a station on a wireless network, comprising:
means for receiving a first message, the first message indicating that a station is operating in one of at least an active, power-save, or ultra-low power power management modes, wherein the indication is communicated in a power management portion of a frame control field of a media access control header, wherein the power management portion comprises more than one bit; and
means for communicating with the station in accordance with the indicated mode, wherein the means for communicating with the station is configured to communicate in accordance with the active power management mode by transmitting data to the station in response to receiving data to be downlinked to the station,
wherein the means for communicating with the station is configured to communicate in accordance with the power save power management mode by transmitting to the station an indication that data is available during a periodic interval in response to receiving data to be downlinked to the station, and
wherein the means for communicating with the station is configured to communicate in accordance with the ultra-low power management mode by transmitting a wake up signal to the station in response to receiving data to be downlinked to the station.

26. The apparatus of claim 25, wherein the wake up signal is configured to be received by a low power receiver.

27. The apparatus of claim 25, wherein the wake up signal is a short duration paging message.

28. A non-transitory computer readable storage medium comprising instructions that when executed cause a processor to perform a method of communicating a power management mode of a station on a wireless network, the method comprising:
transmitting by a station a first message on the wireless network, the first message indicating one of at least an active, power save, and ultra-low power management modes, wherein the indication is communicated in a power management portion of a frame control field of a media access control header, wherein the power management portion comprises more than one bit; and
operating the station in a power management state in accordance with the indicated power management mode,
wherein operating the station in accordance with the active power management mode comprises:
configuring a first receiver to continuously receive one or more frames from the wireless network, and
wherein operating the station in accordance with the power-save power management mode comprises:
operating the first receiver in two different receiver states,
wherein in a first state of the two receiver states, the first receiver is configured to receive at least one frame during a time interval when an access point may transmit at least one frame to the station, and
in a second state of the two receiver states, the first receiver is configured to not receive frames, wherein the first receiver is configured to consume less power when operating in the second receiver state than when operating in the first receiver state,
wherein operating the station in accordance with the ultra-low power management mode comprises:
operating the first receiver in the second receiver state, wherein the station transitions to operate in accordance with the active power management mode in response to a second receiver receiving a message from the wireless network,
determining one or more time intervals when the second receiver may receive a message,
configuring the second receiver to not receive messages during times outside the one or more time intervals, and
wherein the second receiver consumes less power when configured not to receive messages than when configured to receive messages.

29. The computer readable storage medium of claim 28, wherein the message received by the second receiver reserves the wireless network for a time period, and wherein the first receiver operates in the first receiver state during the reserved time period.

30. The computer readable storage medium of claim 28, wherein the message received by the second receiver is of shorter duration than frames received by the first receiver.

31. The computer readable storage medium of claim 28, wherein the message received by the second receiver is of lower energy than any frame received by the first receiver.

32. The computer readable storage medium of claim 28, wherein the one or more time intervals correspond to beacon intervals.

33. The computer readable storage medium of claim 28, wherein the time interval is a beacon interval.

34. A non-transitory computer readable storage medium comprising instructions that when executed cause a processor to perform a method of receiving a power management mode of a station on a wireless network, the method comprising:
receiving a first message, the first message indicating that a station is operating in one of at least an active, power-save, and ultra-low power power management modes, wherein the indication is communicated in a power management portion of a frame control field of a media access control header, wherein the power management portion comprises more than one bit; and
communicating with the station in accordance with the indicated mode, wherein communicating with the station in accordance with the active power management mode comprises transmitting data to the station in response to receiving data to be downlinked to the station, wherein communicating with the station in accordance with the power save power management mode comprises transmitting to the station an indication that data is available during a periodic interval in response to receiving data to be downlinked to the station, and wherein communicating with the station in accordance with the ultra-low power management mode comprises transmitting a wake up signal to the station in response to receiving data to be downlinked to the station.

35. The non-transitory computer readable storage medium of claim 34, wherein the wake up signal is configured to be received by a low power receiver.

36. The non-transitory computer readable storage medium of claim 34, wherein the wake up signal is a short duration paging message.

* * * * *